United States Patent
Ogura

(10) Patent No.: US 8,542,395 B2
(45) Date of Patent: Sep. 24, 2013

(54) IMAGE FORMING APPARATUS AND CONTROL METHOD THEREFOR

(75) Inventor: Keigo Ogura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 720 days.

(21) Appl. No.: 12/554,300

(22) Filed: Sep. 4, 2009

(65) Prior Publication Data

US 2010/0060933 A1 Mar. 11, 2010

(30) Foreign Application Priority Data

Sep. 8, 2008 (JP) ................................. 2008-229770

(51) Int. Cl.
- G06K 15/00 (2006.01)
- G06K 15/12 (2006.01)
- H04N 1/409 (2006.01)
- H04N 1/407 (2006.01)

(52) U.S. Cl.
USPC ........................... 358/1.16; 358/1.7; 358/3.26

(58) Field of Classification Search
None
See application file for complete search history.

(56) References Cited

U.S. PATENT DOCUMENTS

| 6,934,049 B1 * | 8/2005 | Yamada ...................... 358/1.16 |
| 8,237,982 B2 * | 8/2012 | Tachikawa .................... 358/1.7 |
| 2005/0151826 A1 * | 7/2005 | Suzuki et al. ................. 347/225 |
| 2006/0227198 A1 * | 10/2006 | Ng ................................. 347/112 |
| 2006/0256185 A1 * | 11/2006 | Suzuki et al. ................. 347/256 |
| 2009/0323113 A1 * | 12/2009 | Tachikawa ................... 358/1.15 |

FOREIGN PATENT DOCUMENTS

| JP | 08-184772 A | 7/1996 |
| JP | 2001-080124 A | 3/2001 |
| JP | 2003-058418 A | 2/2003 |
| JP | 2003-241131 A | 8/2003 |
| JP | 2004-170755 A | 6/2004 |
| JP | 2007-090620 A | 4/2007 |

\* cited by examiner

Primary Examiner — Satwant Singh

(74) Attorney, Agent, or Firm — Canon USA, Inc., IP Division

(57) ABSTRACT

An image forming apparatus includes DMA control units each of which is provided with DMA controllers. Each DMA controller is provided with a plurality of data buffers respectively corresponding to different addresses in a subscanning direction. Each of a predetermined number of pixel data in a main scanning direction is stored in an associated one of the data buffers. Pixel data stored in each of the data buffers are output to an image memory based on the address in the subscanning direction, which corresponds to the associated data buffer.

8 Claims, 26 Drawing Sheets

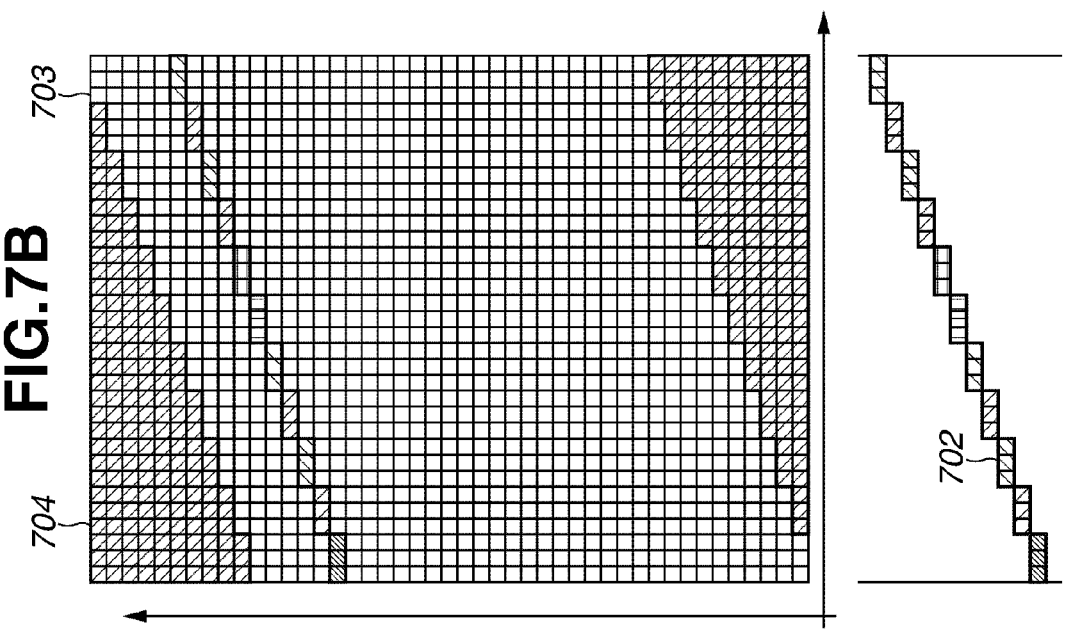
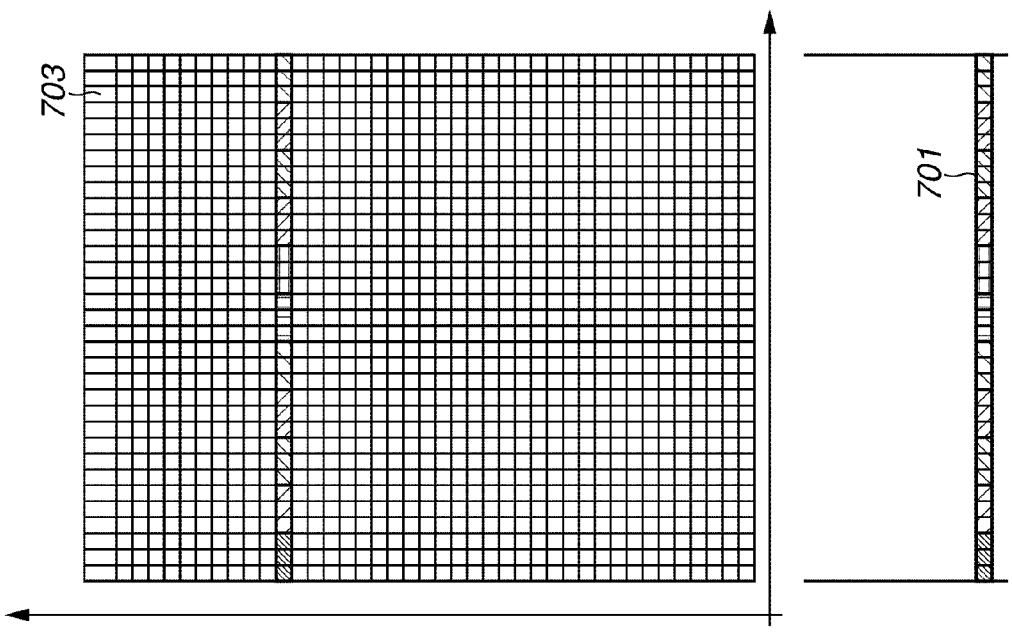

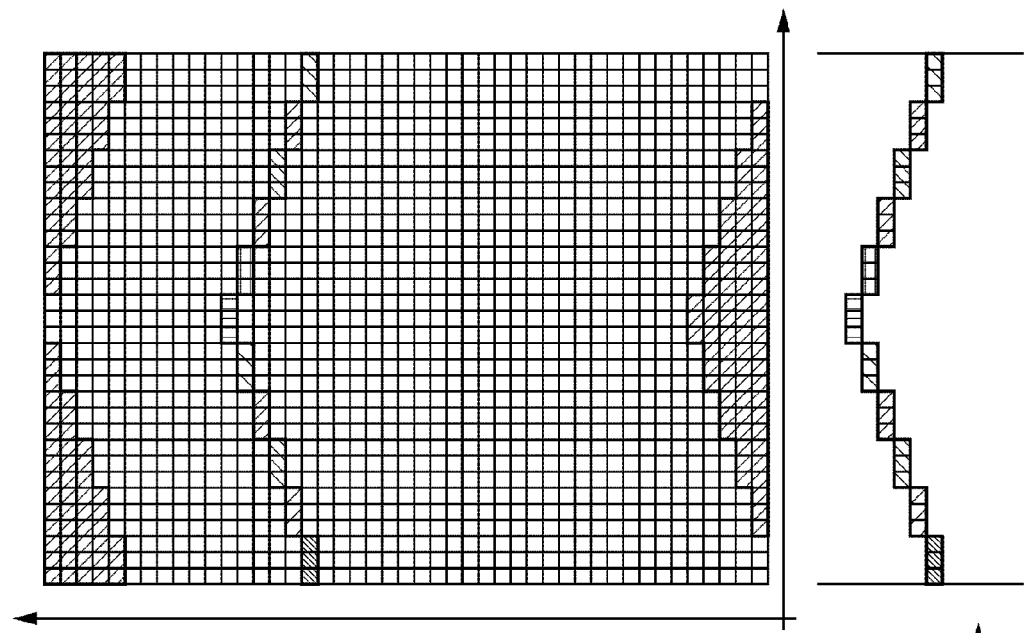
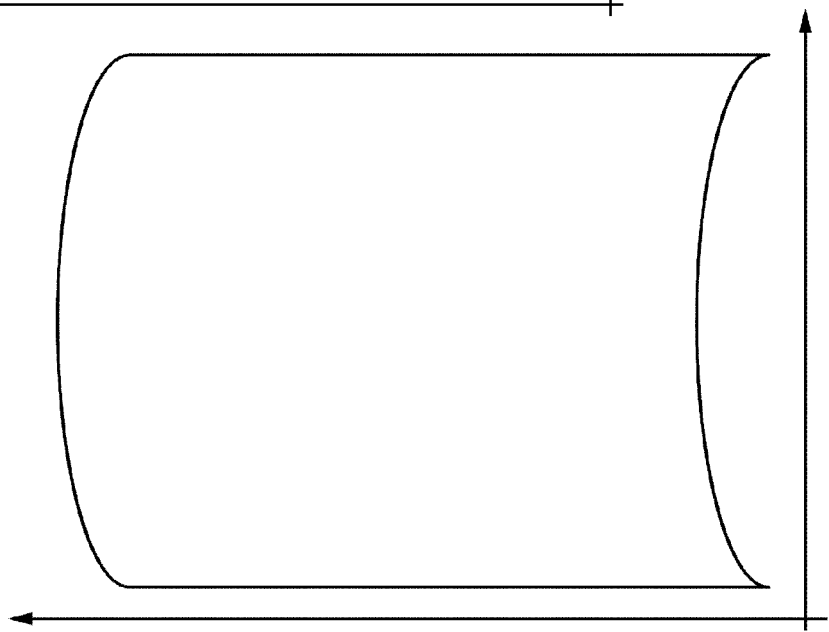
FIG.17B
FIG.17A

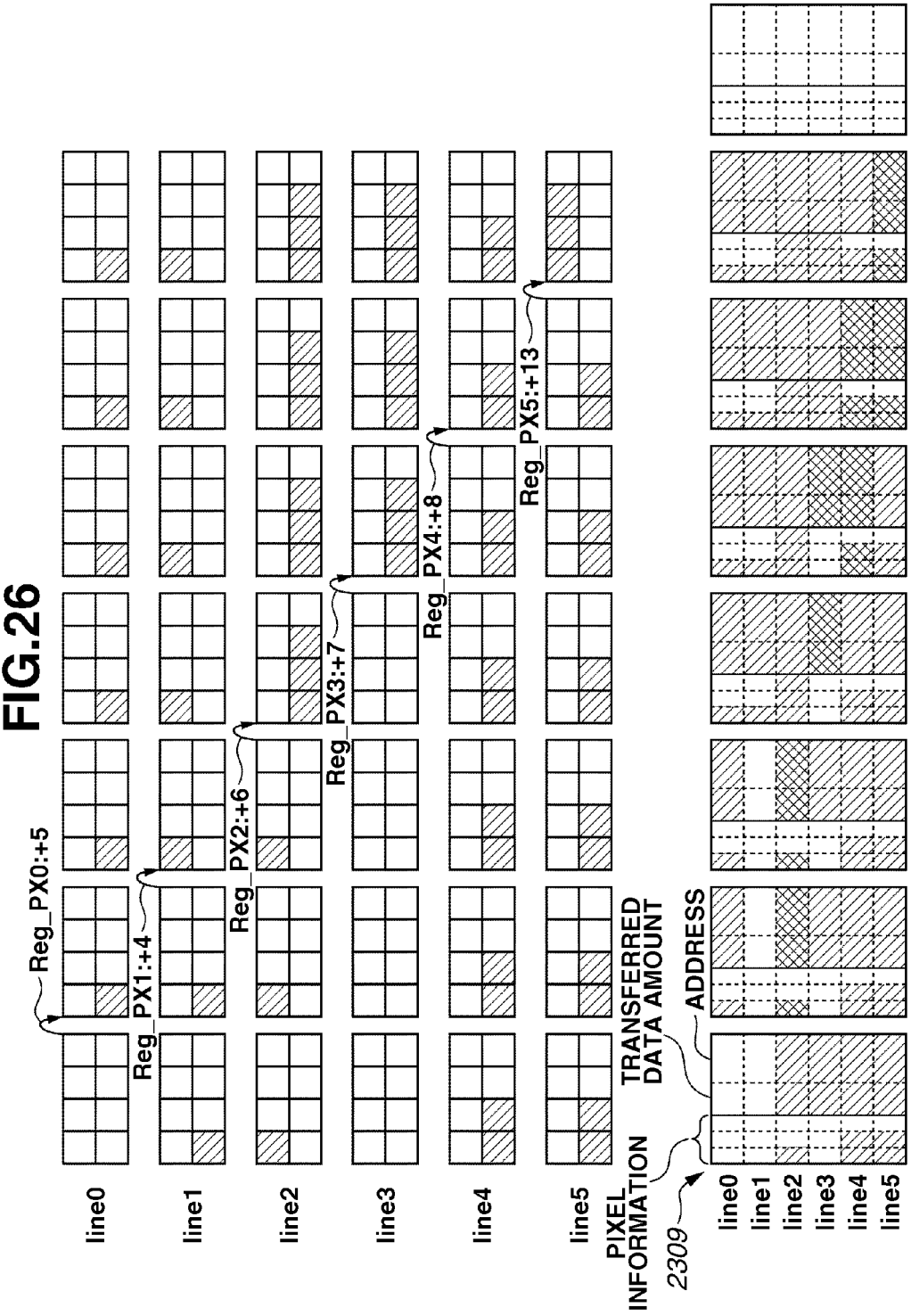

IMAGE FORMING APPARATUS AND CONTROL METHOD THEREFOR

BACKGROUND OF THE INVENTION

1. Field of the Invention

The present invention relates to an image forming apparatus and a control method therefor.

2. Description of the Related Art

Hitherto, an electrophotographic image forming apparatus has been known. In the electrophotographic image forming apparatus, laser light modulated based on image data is emitted from a laser light source. A charged photosensitive drum is irradiated and scanned with this laser light. Consequently, an electrostatic latent image is formed on the photosensitive drum. This electrostatic latent image is visualized as a toner image with toner supplied from a development unit. The toner image on the photosensitive drum is transferred onto a sheet (recording paper) by a transfer unit.

Thus, when the photosensitive drum is irradiated with laser light based on image data of 1 line, a scanning line of the laser light is ideally a straight line parallel to the direction of an axis of the photosensitive drum. However, actually, sometimes, the scanning line is not a straight line parallel to the direction of the axis of the photosensitive drum due to mechanical errors of the mounting positions of the laser light source, the photosensitive drum and the like. That is, sometimes, the scanning line curves.

In order to correct the curve of the scanning line, for example, Japanese Patent Application Laid-Open No. 2003-241131 has discussed the following first method. Japanese Patent Application Laid-Open No. 2004-170755 discusses the following second method.

According to the first method, in a step of assembling an exposure unit to an image forming apparatus body, the magnitude of the slope of the scanning line is measured using an optical sensor. In addition, the exposure unit is mechanically inclined. Thus, the slope of the scanning line is adjusted. Then, the exposure unit is assembled to the image forming apparatus body.

According to the second method, the magnitudes of the slope and the curve of the scanning line are measured using an optical sensor. Then, bitmap data is corrected to cancel the slope and the curve of the scanning line. Consequently, an image is formed based on the corrected bitmap data.

The second method is to correct the curve of the scanning line and restrain occurrence of misregistration by electrically processing image data. Thus, the second method can eliminate necessity for a mechanical adjustment member and an adjustment step at assembly. Consequently, as compared with the above first method, the second method can restrain occurrence of misregistration at low cost.

However, according to the above second method, line buffers are used to perform blend processing on a curved scanning line to record data of an adjacent line thereabove or therebelow. Necessary capacity of each line buffer depends on the width of the curved part of the scanning line. For example, when the width of the curved part of the scanning line spans N lines of an image represented by bitmap data, line buffers whose total capacity is sufficient to store bitmap data of N lines are necessary. The number N of the spanned lines varies with the apparatus. The total capacity of the line buffers actually mounted in the apparatus should correspond to the number of the lines, which exceeds the maximum value of such variation in the number N of the spanned lines. Consequently, the total capacity of the line buffers increases and the size of a circuit for correcting the bitmap image data increases, which results in increase in cost of the apparatus.

SUMMARY OF THE INVENTION

The present invention is directed to an improved image forming apparatus and a control method therefor.

According to an aspect of the present invention, an image forming apparatus having an exposure unit configured to scan an image carrier in a main scanning direction with irradiation light modulated based on image data, includes an input unit configured to input image data in units of lines, a storage unit configured to store the image data input by the input unit, a plurality of data retention units configured to respectively correspond to different addresses in a subscanning direction of the storage unit, a writing unit configured to write pixel data constituting the image data input in the units of lines to the plurality of data retention units based on curve information for correcting a curve of a scanning line of the irradiation light to be irradiated onto the image carrier, a control unit configured to control the writing unit to write, when the writing unit writes a predetermined number of pixel data to a specific one of the plurality of data retention units, to an address in the subscanning direction, which corresponds to the specific one of the plurality of data retention units, in the storage unit, and a transfer unit configured to read the image data written to the storage unit while changing the address in the main scanning direction without changing the address in the subscanning direction, and to transfer the read image data to the exposure unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7A schematically illustrates image data output to the image memory 203 after image processing is performed by the image processing unit 210.

FIG. 7B schematically illustrates image data written to the image memory 203 according to curve information (register information).

FIG. 17A illustrates an example of a curve of an image when the curve of a scanning line is corrected at an image printing unit in a second exemplary embodiment of the present invention.

FIG. 17B schematically illustrates image data written to the image memory by the DMA controller according to the curve of the image illustrated in FIG. 17A.

FIG. 26 illustrates a state in which image data is stored in a random access memory (RAM) illustrated in FIG. 24.

DETAILED DESCRIPTION OF THE EMBODIMENTS

Figure 1:
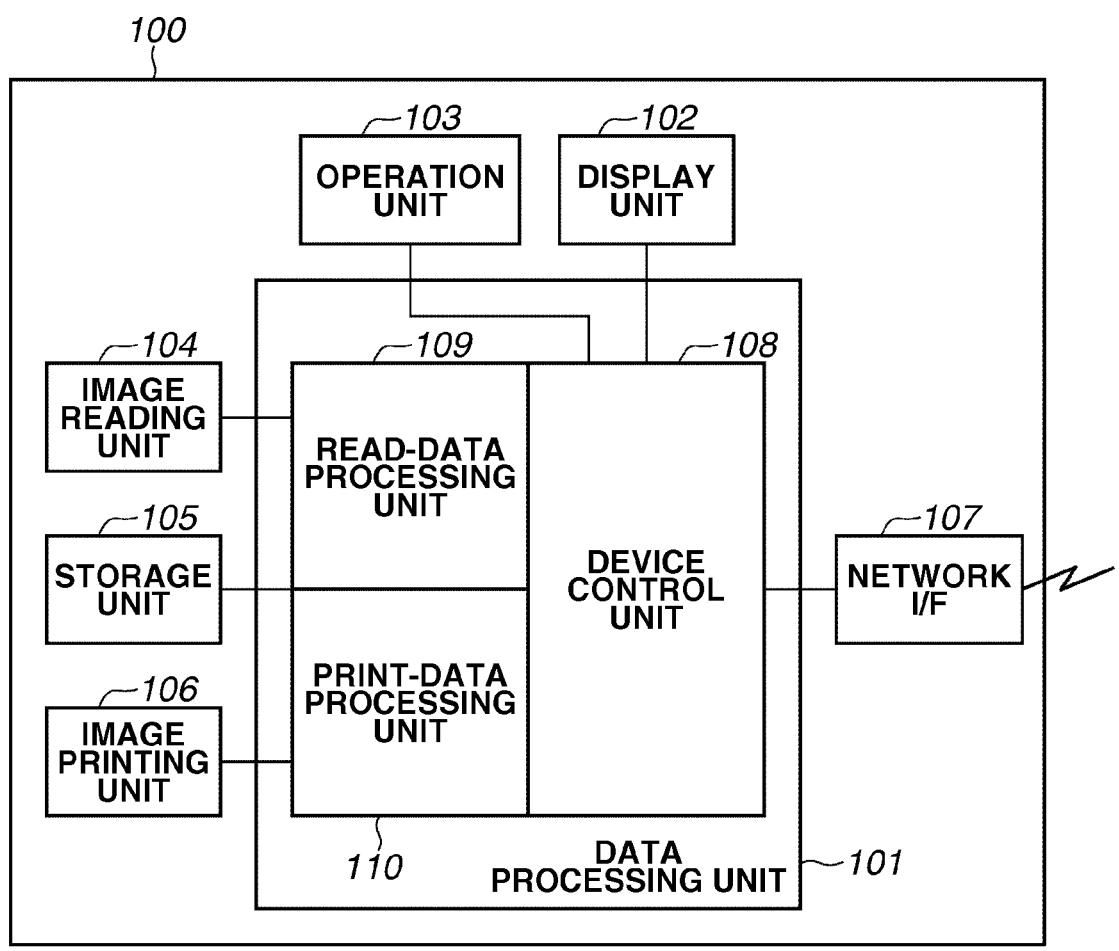
FIG. 1 is a diagram illustrating a configuration of an image forming apparatus according to a first exemplary embodiment of the present invention.

Various exemplary embodiments, features, and aspects of the invention will be described in detail below with reference to the drawings. In the drawings, elements and parts which are identical throughout the views are designated by identical reference numerals. Thus, duplicate description thereof is omitted.

FIG. 1 is a diagram illustrating a configuration of an image forming apparatus according to a first exemplary embodiment of the present invention. In the following description of the present embodiment, a multifunction peripheral (MFP) that is a multifunction apparatus implementing a plurality of functions is described as the image forming apparatus.

As illustrated in FIG. 1, an image forming apparatus 100 has an image reading unit 104 including an original glass plate and an automatic document feeder (ADF). In the image reading unit 104, an original fed from the ADF or placed on the original glass plate is irradiated with light from a light source (not shown). Light reflected from the original is formed into an image on a solid image sensor (not shown) via a lens (not shown). The solid image sensor converts the formed light image into an image signal. This image signal represents a raster image having a predetermined density (e.g., 600 dots per inch (dpi)). This signal is sent to the data processing unit 101. An original read by the image reading unit 104 are, e.g., a paper original, and a printed material formed of a recording medium (e.g., an overhead projector (OHP) sheet, a transparent original such as a film, and cloth) other than paper.

The data processing unit 101 includes a read-data processing unit 109, a print-data processing unit 110, and a device controller 108. The read-data processing unit 109 performs shading correction, γ-correction, and the like on an image signal and outputs to the print-data processing unit 110 the image signal subjected to such processing as a signal representing image data. The print-data processing unit 110 converts the image data to data that can be printed by the image printing unit 106. Then, the print-data processing unit 110 outputs the printable data to the image printing unit 106. The print-data processing unit 110 causes a storage unit 105 to store the image data, if necessary.

The image printing unit 106 forms image by an electrophotographic method. More specifically, the image printing unit 106 modulates laser light according to image data. A photosensitive drum (image carrier) which rotates in the direction of a subscanning direction is irradiated with the modulated laser light, while the photosensitive drum is scanned with the laser light in a main scanning direction. Consequently, an electrostatic latent image is formed on the photosensitive drum. This electrostatic latent image is visualized as a toner image with toner supplied from a development unit. The toner image formed on the photosensitive drum is transferred onto a sheet (recording paper) by a transfer device.

An operation unit 103, a display unit 102, and a network I/F 107 are connected to a device controller 108. The operation unit 103 includes a key group (not shown) and a display device (not shown) with which a user inputs information on the setting of the number of copies, the type of a recording medium to be used, and an operation mode. The operation unit 103 outputs to the device controller 108 information input in response to a user's operation on the key group. The operation unit 103 displays various information, such as information representing options set by a user, and information (e.g., information representing a state of the apparatus) sent by the device controller 108, in the display device.

The device controller 108 controls various units, such as the above read-data processing unit 109 and the print-data processing unit 110, based on information input via the operation unit 103. Thus, the device controller 108 implements various functions. For example, an image is read by the image reading unit 104 from an original. The image printing unit 106 records the image read from the original onto a recording medium. Thus, a copy function is implemented. In addition, the image printing unit 106 records on a recording medium image data transferred from an external apparatus on a network such as a local area network (LAN) via the network I/F 107. Thus, a printer function is implemented. Additionally, image data read by the image reading unit 104 from an original is transferred to an external apparatus on a network via the network I/F 107. Thus, a network scanner function is implemented.

Figure 2:
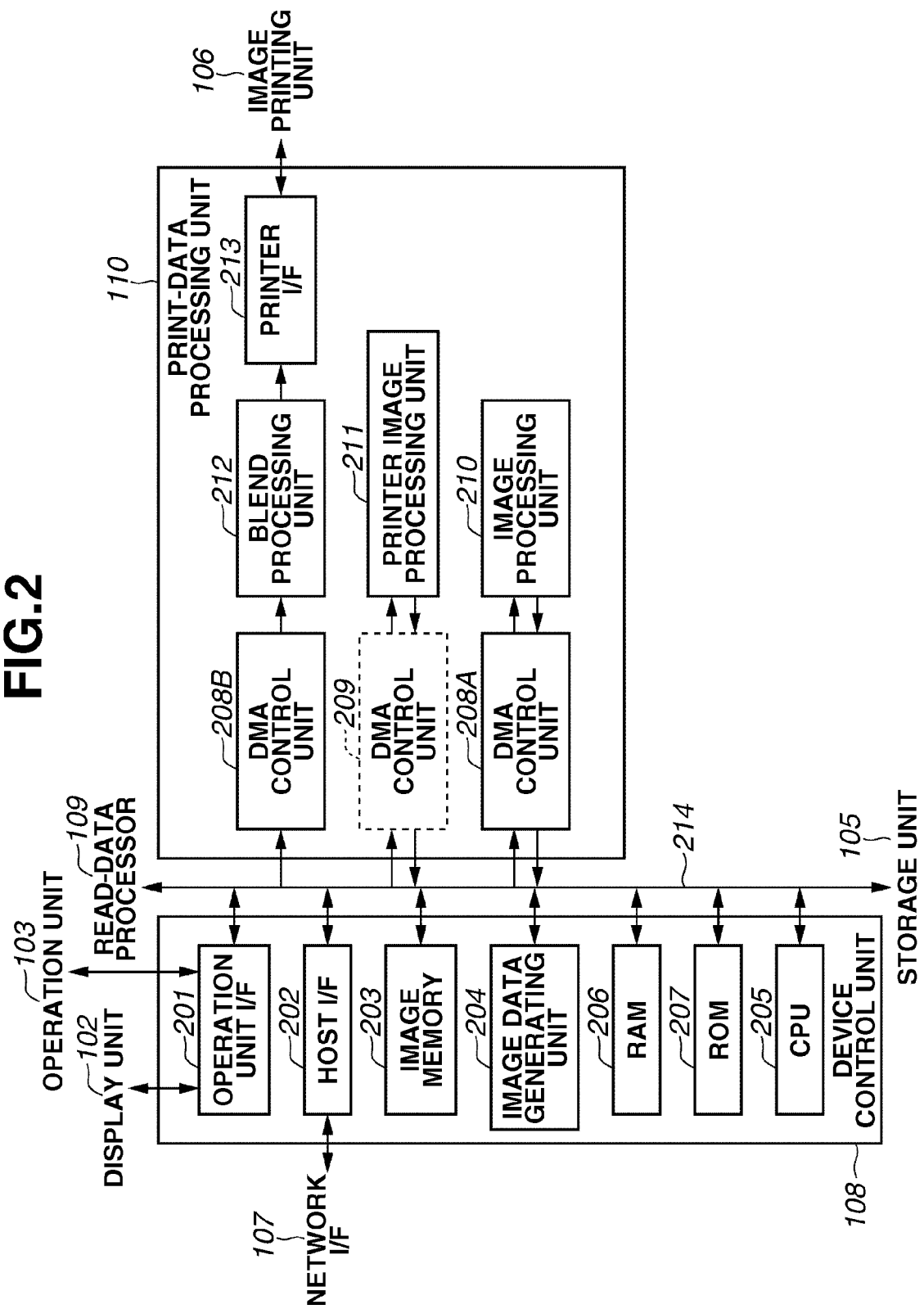
FIG. 2 is a block diagram illustrating detailed configurations of a print-data processing unit and a device control unit provided in a data processing unit illustrated in FIG. 1.

Next, detailed configurations of a print-data processing unit 110 and the device controller 108 provided in the data processing unit 101 are described below with reference to FIG. 2. FIG. 2 is a block diagram illustrating the detailed configurations of the print-data processing unit 110 and the device controller 108 provided in the data processing unit 101 illustrated in FIG. 1.

As illustrated in FIG. 2, the device controller 108 of the data processing unit 101 has a CPU 205. The CPU 205 is connected to a read-only memory (ROM) 207, a RAM 206, an operation unit I/F 201, a host I/F 202, an image memory (image storage unit) 203, and an image data generating unit 204 via a system bus 214. The CPU 205 performs various processing according to a program stored in the ROM 207 using the RAM 206 as a work area. The system bus 214 is constituted by an address bus (not shown) and a system bus (not shown).

The operation unit I/F 201 constitutes an I/F for exchanging information between the operation unit 103 and the CPU 205. For example, various instructions input by a user from the operation unit 103 are sent to the CPU 205 via the operation unit I/F 201. Information to be displayed in the display device of the operation unit 103 is sent to the operation unit 103 via the operation unit I/F 201.

The host I/F 202 constitutes an input/output unit for exchanging data between the data processing unit 101 and the network I/F 107. The host I/F 202 is provided with an input buffer (not shown) for inputting print data and set values for instructing operations of the apparatus, which are sent from the data processing unit 101. The host I/F 202 is provided with an output buffer (not shown) for temporarily storing signals and output data including device information data, which are sent to the data processing unit 101.

The image data generating unit 204 performs analysis on print data input via the host I/F 202. Then, the image data generating unit 204 generates intermediate language data according to a result of the analysis. Then, image data generating unit 204 generates bitmap data that can be processed by the image printing unit (printer engine) 106. The input print data is constituted by, e.g., page description language (PDL) data. More specifically, in addition to the analysis of the print data and the generation of the intermediate language data, a rasterization process is performed concurrently with the generation of the intermediate language data, which is performed based on a result of the analysis of the print data input via the host I/F 202. The rasterization process is to convert RGB display color data included in the print data to YMCK color data which can be processed by the image printing unit 106. In addition, the image data generating unit 204 performs processes of converting character codes included in the print data to font data, such as bit patterns and outline fonts, which are preliminarily stored in the apparatus. Subsequently, bitmap data is created in units of pages or bands by the rasterization processing. Then, pseudo gradation processing using a dither pattern is performed on this bitmap data. Consequently, the image data generating unit 204 creates bitmap data (image data) that can be printed by the printing unit 106. The created bitmap data is stored in the image memory 203.

The print-data processing unit 110 includes a plurality of DMA controllers 208A, 208B, and 209. Each of the DMA controllers 208A and 209 controls the writing and the reading of image data to and from the image memory 203 based on instructions from the CPU 205. The DMA controller 208B controls the reading of image data from the image memory 203 based on instructions from the CPU 205.

The DMA controller 208A reads image data from the image memory 203 and transfers the read image data to an image processing unit 210. The image processing unit 210 performs halftone processing on the image data according to characteristics of the image printing unit 106. The processed image data is transferred by the DMA controller 208A to the image memory 203. Then, the transferred image data is written to the image memory 203.

Subsequently, the processed image data is read from the image memory 203 by the DMA controller 209. Then, the read image data is transferred to the printer image processing unit 211. The printer image processing unit 211 performs image processing on the image data according to characteristics of the image printing unit 106. After this image processing, the image data is transferred to the image memory 203 by the DMA controller 209 again. Then, the image data is written to the image memory 203.

Subsequently, the image data subjected to the image processing is read by the DMA controller 208B from the image memory 203. Then, the read image data is transferred to the blend processing unit 212. The blend processing unit 212 performs blend processing on the image data.

The blend processing unit is a gradation correction unit for performing color discrepancy correction in less than a pixel unit. The gradation correction is performed by adjusting exposure ratios at dots located at anteroposterior positions in the sub-scanning direction to thereby correct a discrepancy amount of the decimal part of a color discrepancy correction amount. The color discrepancy correction amount is calculated according to a predetermined operational expression using a correction coefficient and a distribution ratio of an exposure amount to the dots located at anteroposterior positions in the sub-scanning direction. The calculated correction amounts are applied to pixels, at which the gradation correction is determined to be necessary, at a place at which a curve is generated. Thus, the gradation of an original image is changed at such pixels, so that irregularities of the image caused by switching the line are alleviated. An exposure image subjected to the gradation correction is transferred to the image printing unit 106 via the printer I/F 213 as video signals.

The printer I/F 213 constitutes an input/output unit for inputting and outputting signals transmitted to and received from the image printing unit 106. The printer I/F 213 is provided with an output buffer (not shown), which temporarily stores video signals transferred to the image printing unit 106, and an input buffer (not shown), which temporarily stores signals sent from the image printing unit 106.

Figure 3:
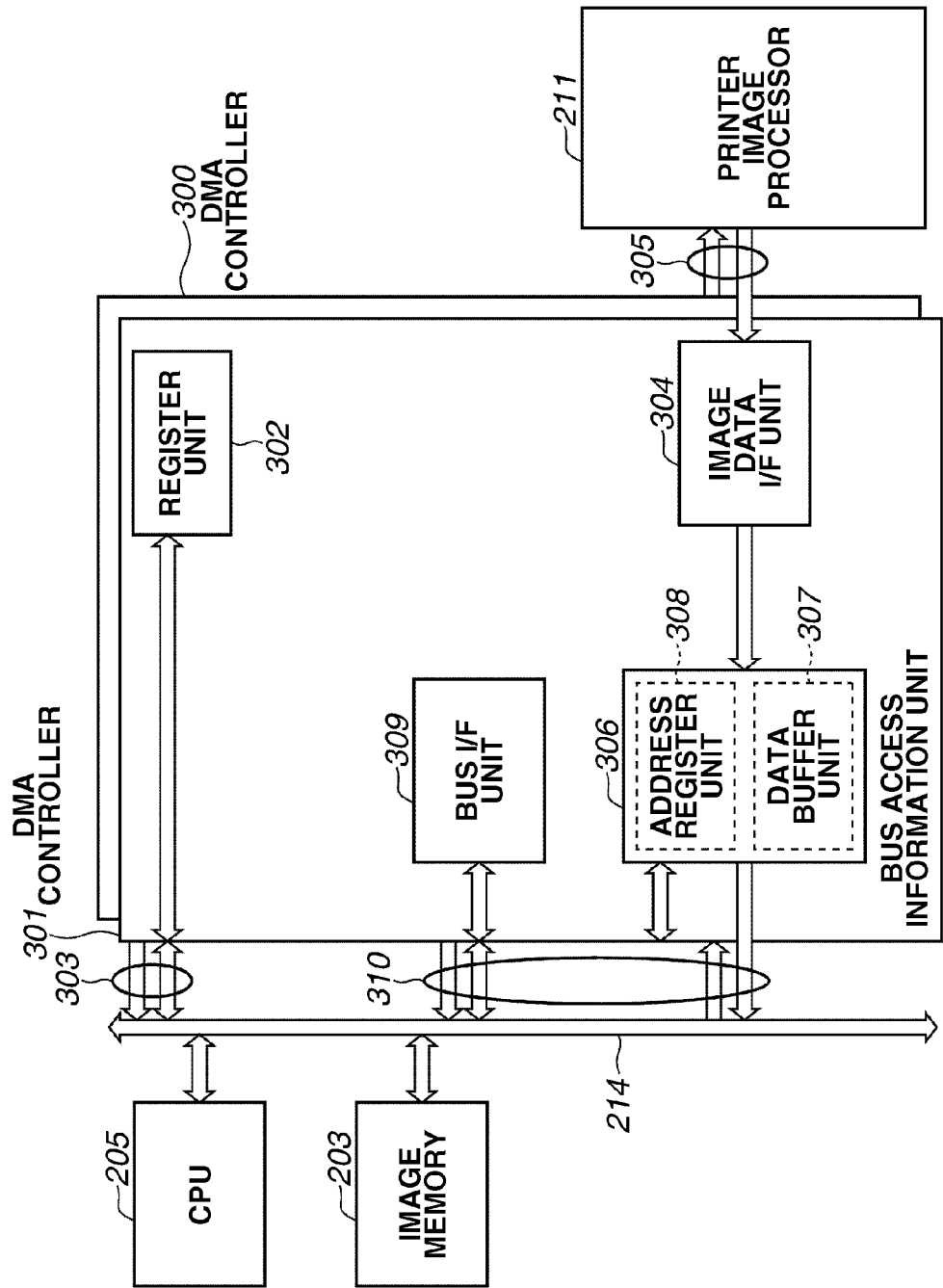
FIG. 3 is a block diagram illustrating a detailed configuration of each direct memory access (DMA) control unit illustrated in FIG. 2.

Next, a detailed configuration of the DMA control unit 209 is described by referring to FIG. 3. FIG. 3 is a block diagram illustrating the detailed configuration of the DMA control unit 209 illustrated in FIG. 2.

As illustrated in FIG. 3, the DMA control unit 209 includes a DMA controller 300 for reading image data from the image memory 203, and a DMA controller 301 for writing image data to the image memory 203.

The DMA controller 300 is a general-purpose DMA controller that performs a DMA operation based on a start address, an end address, and a transfer byte length set by the CPU 205. The DMA controller 301 writes image data to the image memory 203. However, the DMA controller 301 can function as a DMA controller that reads image data from the image memory 203.

The DMA controller 301 includes a register unit 302, an image data I/F unit 304, a bus access information unit 306, and a bus interface unit 309. The register unit 302 is constituted by a plurality of registers (not shown). Instructions to the DMA controller 301 from the CPU 205 are executed by writing an appropriate value in each register of the register unit 302 via the bus I/F 214 and a CPU I/F 303.

The image data I/F 304 is connected to the printer image processing unit 211 via an image processing data I/F 305. The image processing data I/F 305 is a bus for transferring pixel data in units of cycles. Signals transferred through the bus include a valid signal and a data signal. Pixel data taken into the DMA controller 301 is buffered in a data buffer unit 307 of the bus access information unit 306.

The bus access information unit 306 is provided with a plurality of sets each of which is constituted by a data buffer unit 307 and an address register unit 308. The number of the sets corresponds to the maximum number of scanning-line-changes, which corresponds to a change in the address in the sub-scanning direction, according to the curve information of the scanning line. The bus access information unit 306 manages a buffering state of the data buffer unit 307 and monitors whether the buffer unit is brought into a full state. In the case of a reading DMA controller, it is monitored whether the buffer unit is put into an empty state. If the buffer unit is brought into a full (or empty) state, the bus I/F unit 309 makes a bus access request to the system bus 214 via the data bus I/F 310. When the access request is established, the bus I/F unit 309 reads address information and data of the bus access information unit 306 and transfers the read information and data to the image memory 203. In addition, the value of the address of the address information unit 306 is sequentially increased in response to a transfer end notification from the bus I/F unit 309 which controls the value of the address of the bus access information unit 306. Upon completion of transfer of data of 1 line, a preset value is added to an address counter value. Thus, a current line is moved to the next line corresponding to a new address counter value.

Thus far, the configuration of the DMA control unit 209 has been described. A configuration of the DMA control unit 208A is similar to that of the DMA control unit 209. The DMA control unit 208B transfers image data to the image printing unit 106. Therefore, the DMA control unit 208B is constituted only by the DMA controller 300 for reading image data from the image memory 203.

Figure 4:
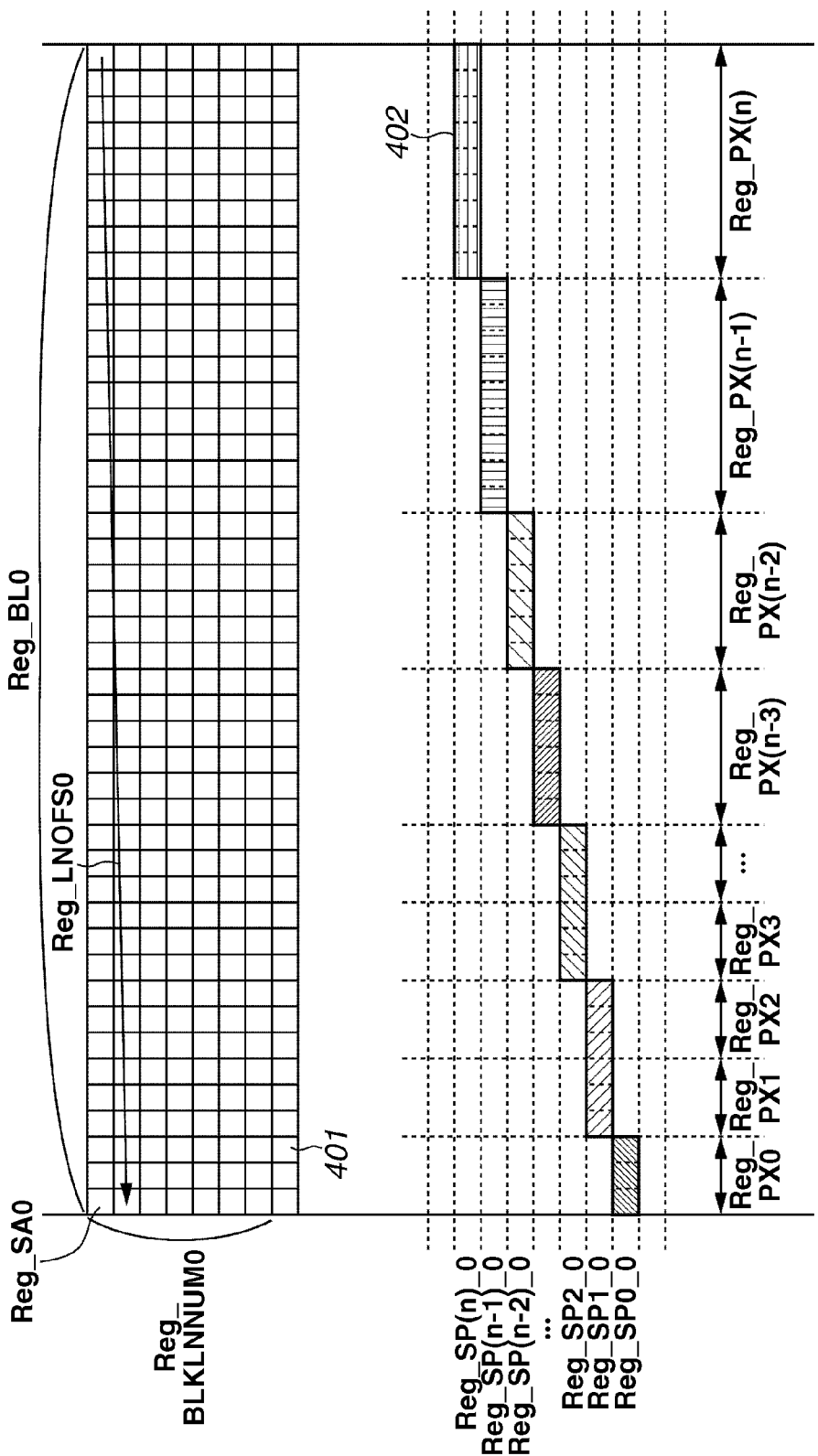
FIG. 4 illustrates register information 401 relating to image data stored in an image memory 203, and register information 402 corresponding to curve information.
Figure 5:
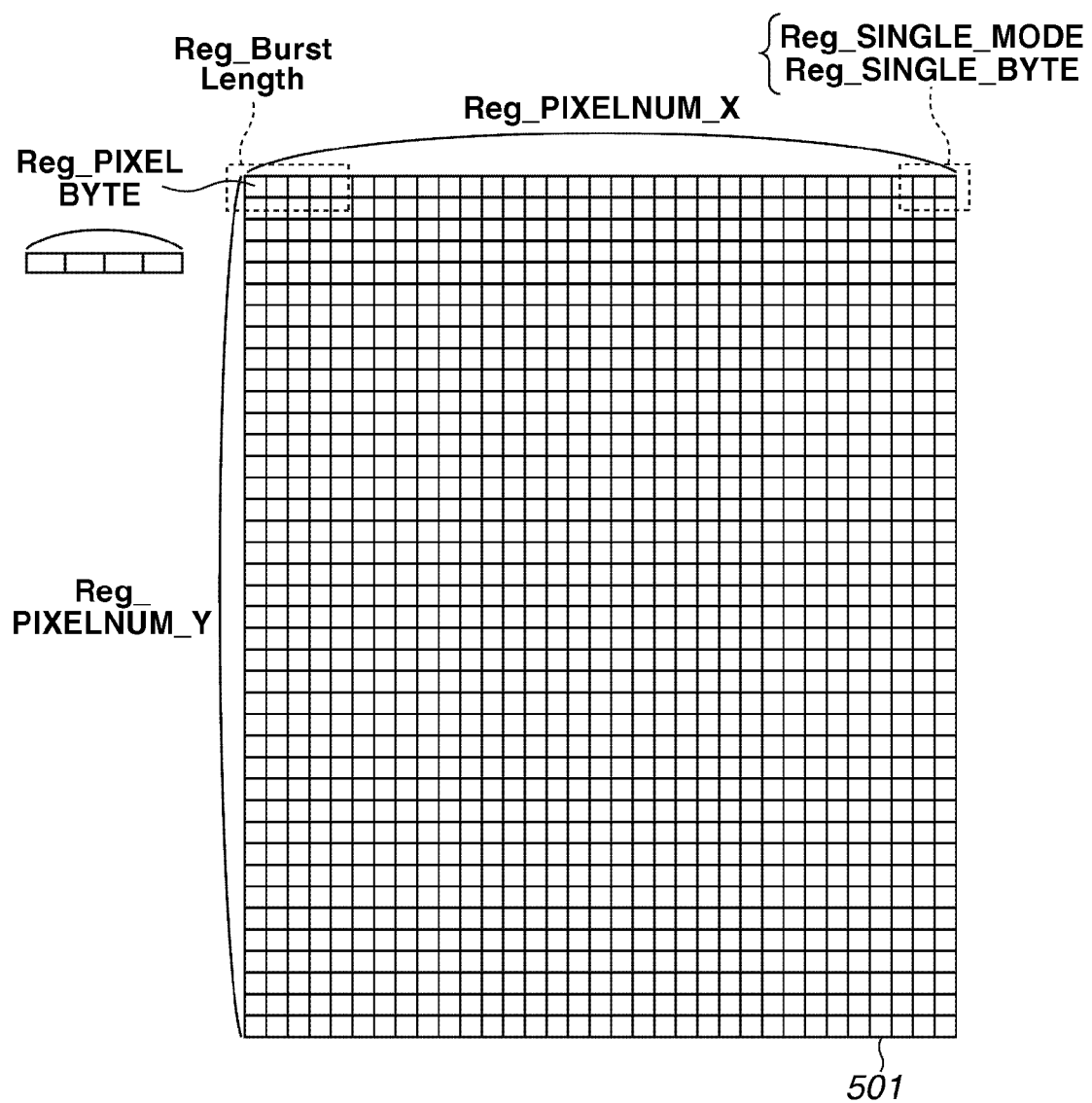
FIG. 5 illustrates register information 501 that relates to an image size.

Next, the register unit 302 of the DMA controller 301 of the DMA control unit 209 is described below with reference to FIGS. 4 and 5. FIG. 4 illustrates register information 401 relating to image data stored in an image memory 203, and register information 402 corresponding to curve information. FIG. 5 illustrates register information 501 that relates to an image size.

The register unit 302 is provided mainly with the following registers described in Table 1 listed below.

TABLE 1

| Name of Register | | Explanatory Notes |
| --- | --- | --- |
| Reg_SA [(*1)] | Start address | Start address on an image memory 203, from which an image to be accessed is stored |
| Reg_BL [(*1)] | Burst length | Amount of data of 1 line [bytes] |
| Reg_LNOFS [(*1)] | Line offset | Address offset corresponding to subsequent 1 line [bytes] |

TABLE 1-continued

| Name of Register | | Explanatory Notes |
| --- | --- | --- |
| Reg_BLKLNNUM | Block line number | Maximum width of a scanning-line-change [lines] (Maximum number of a change in the scanning line in the subscanning direction) |
| Reg_PX [(*1)] | Pixel number per segment | The number of pixels in the main scanning direction up to a pixel at which a scanning-line-change occurs |
| Reg_SP [(*1)] | Pixel number per step | Amount of displacement in the subscanning direction when a scanning-line-change occurs |
| Reg_BurstLength | Burst length | Burst transfer length (bl = 2/4/8 . . . ) |
| Reg_PIXELBYTE | Pixel byte number | The number of bytes per pixel [bytes] |
| Reg_PIXELNUM_X | Pixel number for horizontal direction | The number of pixels in the main scanning direction |
| Reg_PIXELNUM_Y | Pixel number for vertical direction | The number of pixels in the subscanning direction |
| Reg_SINGLE_MODE [(*2)] | Single access mode | Memory access mode at a line end 1: single access mode 0: burst transfer mode |
| Reg_SINGLE_BYTE | Single byte number | Data amount at a line end [bytes] |

(*1) one of values 0 to N (N is a positive integer) is stored.
(*2) Reg_SINGLE_MODE is a mode register for selecting a mode of processing data at a line end. When image data of 1 page is stored in the image memory 203 without space, it is necessary to perform access to fractional data at a line end in a single access mode. This mode is effective when reducing the memory capacity. On the other hand, in a burst transfer mode, fractional data (dummy data) at a line end is transferred to the data buffer unit 307 by being padded, so that data of a burst length can be stored therein. This mode is effective when giving priority to performance. The resister Reg_SINGLE_BYTE is used to determine validity of data according to whether the single access mode (corresponding to the register Reg_SINGLE_MODE) is effective.

As illustrated in, e.g., FIGS. 4 and 5, in each of the registers, associated register information is set. Image data is written to the memory based on the register information.

Figure 6B:
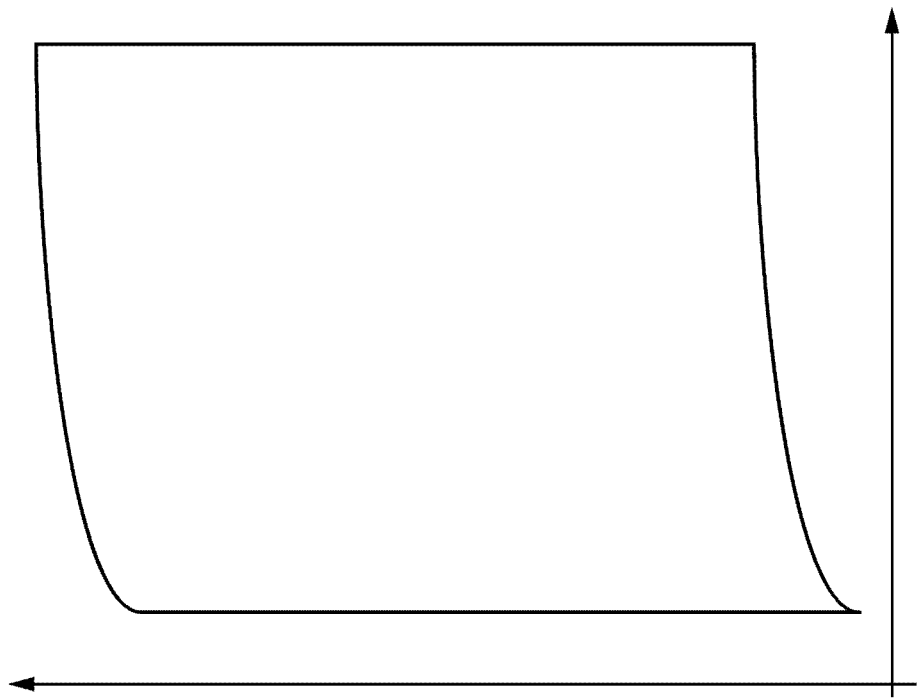
FIG. 6B schematically illustrates a curved alignment of image data for correcting the curve of a scanning line, which is caused in an image printing unit.
Figure 6A:
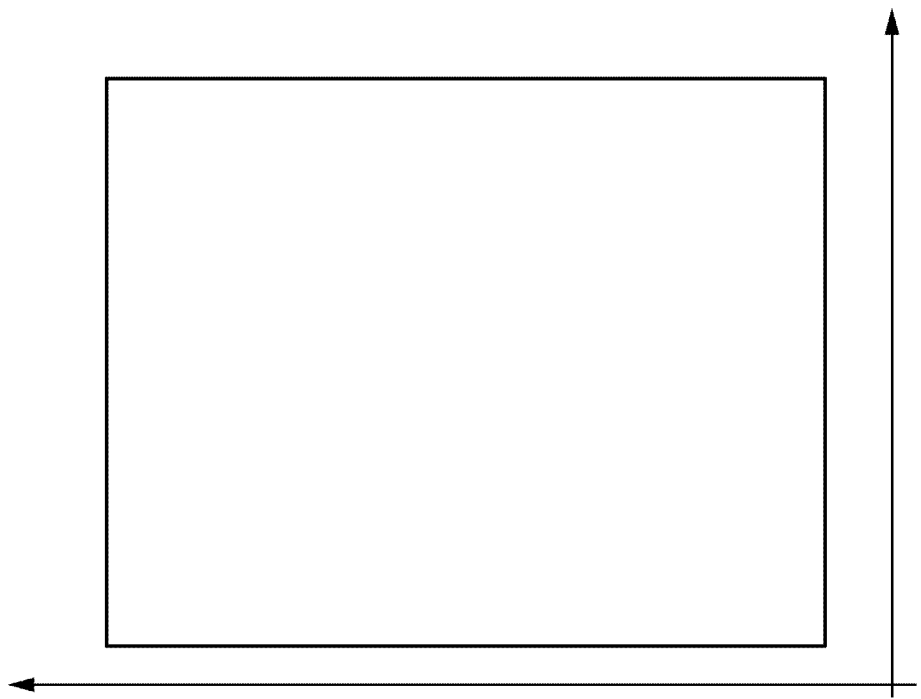
FIG. 6A schematically illustrates the alignment of data generated by an image processing unit 210 on the image memory.

Next, a method for correcting the curve of the scanning line in the image printing unit 106 is described below with reference to FIGS. 6A through 7B. FIG. 6A schematically illustrates the alignment of data generated by an image processing unit 210 on the image memory 203. FIG. 6B schematically illustrates a curved alignment of image data for correcting the curve of a scanning line, which is caused in an image printing unit 106. FIG. 7A schematically illustrates image data output to the image memory 203 after image processing is performed by the image processing unit 210. FIG. 7B schematically illustrates image data written to the image memory 203 according to curve information (register information).

It is assumed that image data is written to the image memory 203 so that the image data is arranged therein like a rectangle, as illustrated in, e.g., FIG. 6A, regardless of the curve of the scanning line in the image printing unit 106. In addition, it is assumed that curving of the scanning line occurs in a scan in the main scanning direction, as illustrated in FIG. 6B. In this case, a curve of the scanning line can be corrected by outputting the image data to the image printing unit 106 while the scanning line is changed to another scanning line in the subscanning direction according to the curve information. Consequently, an electrostatic latent image having no distortion is formed on the photosensitive drum. That is, an image can be formed, which has no distortion due to the curving of the scanning line.

More specifically, when image data (see FIG. 6A) written to the image memory 20 is output to the image printing unit 106, image data processed by the image processing unit 210 is read line by line by the DMA controller 300 of the DMA control unit 209. Then, the read image data of each single line is transferred to the printer image processing unit 211.

Subsequently, in the printer image processing unit 211, the image data of each single line is subjected to associated image processing. Image data of each single line subjected to the associated image processing is written to the image memory 203 so as to be arranged like a rectangle as illustrated in FIG. 7A.

When the image data of each single line subjected to the associated image processing in the printer image processing unit 211 is input, pixel data 701 thereof is input to the DMA controller 301 pixel by pixel. The DMA controller 301 writes the pixel data to the pixel memory 203 while updating a write address in the subscanning direction, which corresponds to the input pixel data, according to the curve information representing the curving characteristics of the scanning line. Consequently, the pixel data 701 illustrated in FIG. 7A is written to the image memory 203 as pixel data 702 illustrated in FIG. 7B. Thus, the pixel data is written to the image memory 203 while the write address in the subscanning direction is updated according to the curve information. Finally, image data 703 is obtained. In FIG. 7B, a part 704 illustrated in gray represents a dummy image group created to surround image data written according to the curve information. Apparently, a region, in which image data is written, is formed like a rectangular one by the dummy image group.

Figure 8:
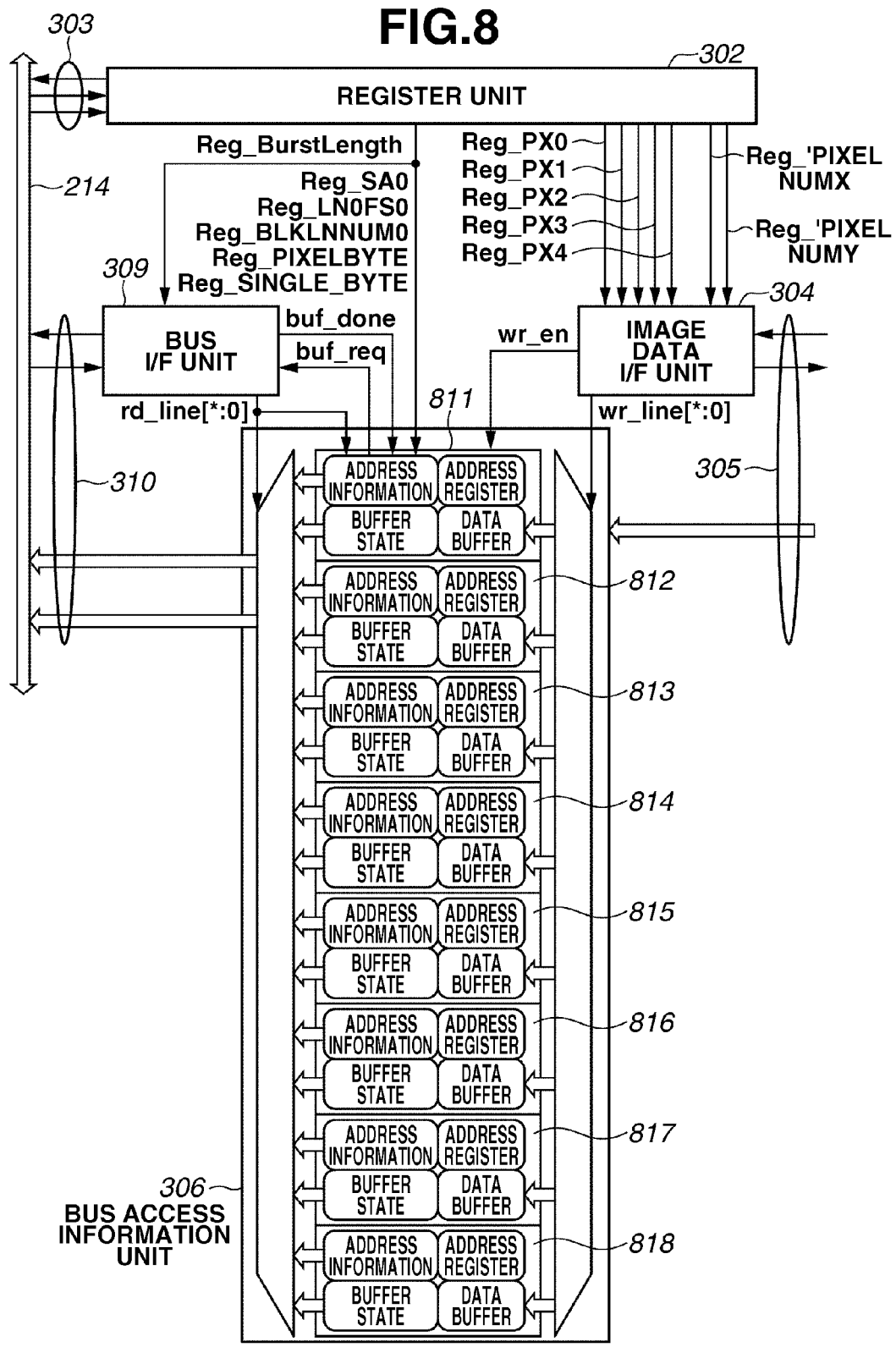
FIG. 8 is a block diagram illustrating an internal configuration of a DMA controller illustrated in FIG. 3 in the DMA control unit illustrated in FIG. 2.
Figure 9:
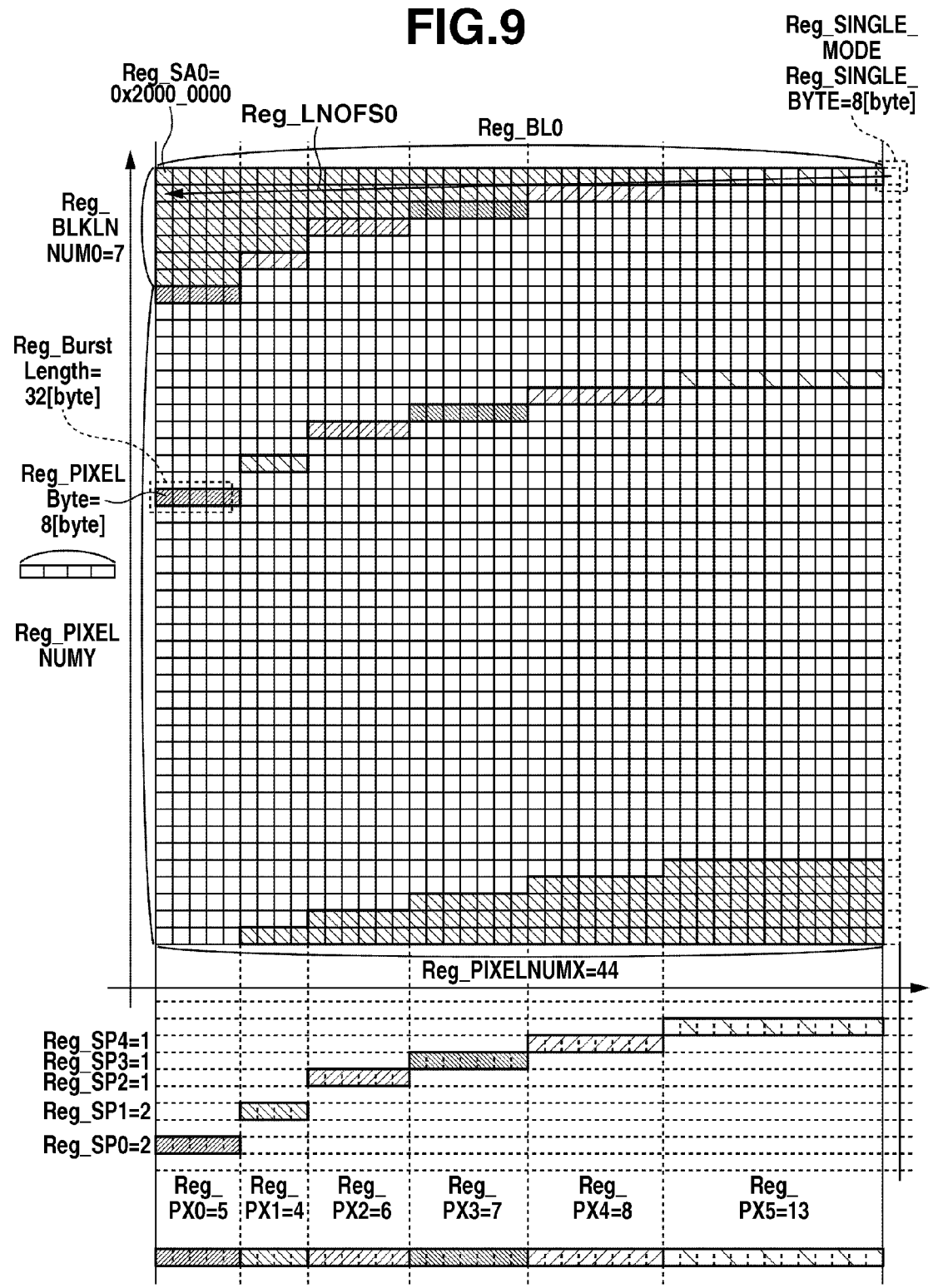
FIG. 9 illustrates an example of register information set in a DMA controller.
Figure 10:
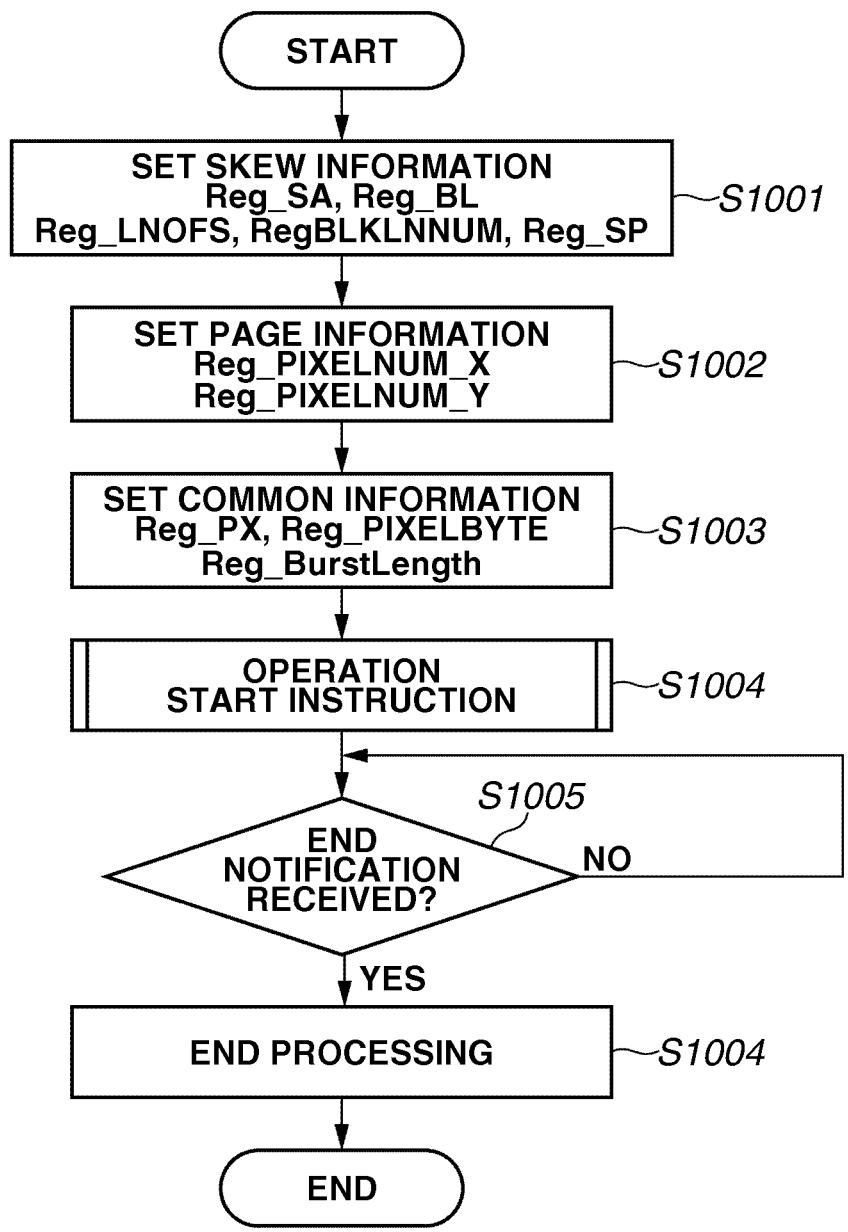
FIG. 10 is a flowchart illustrating a procedure for setting register information in a DMA controller by a central processing unit (CPU).
Figure 11:
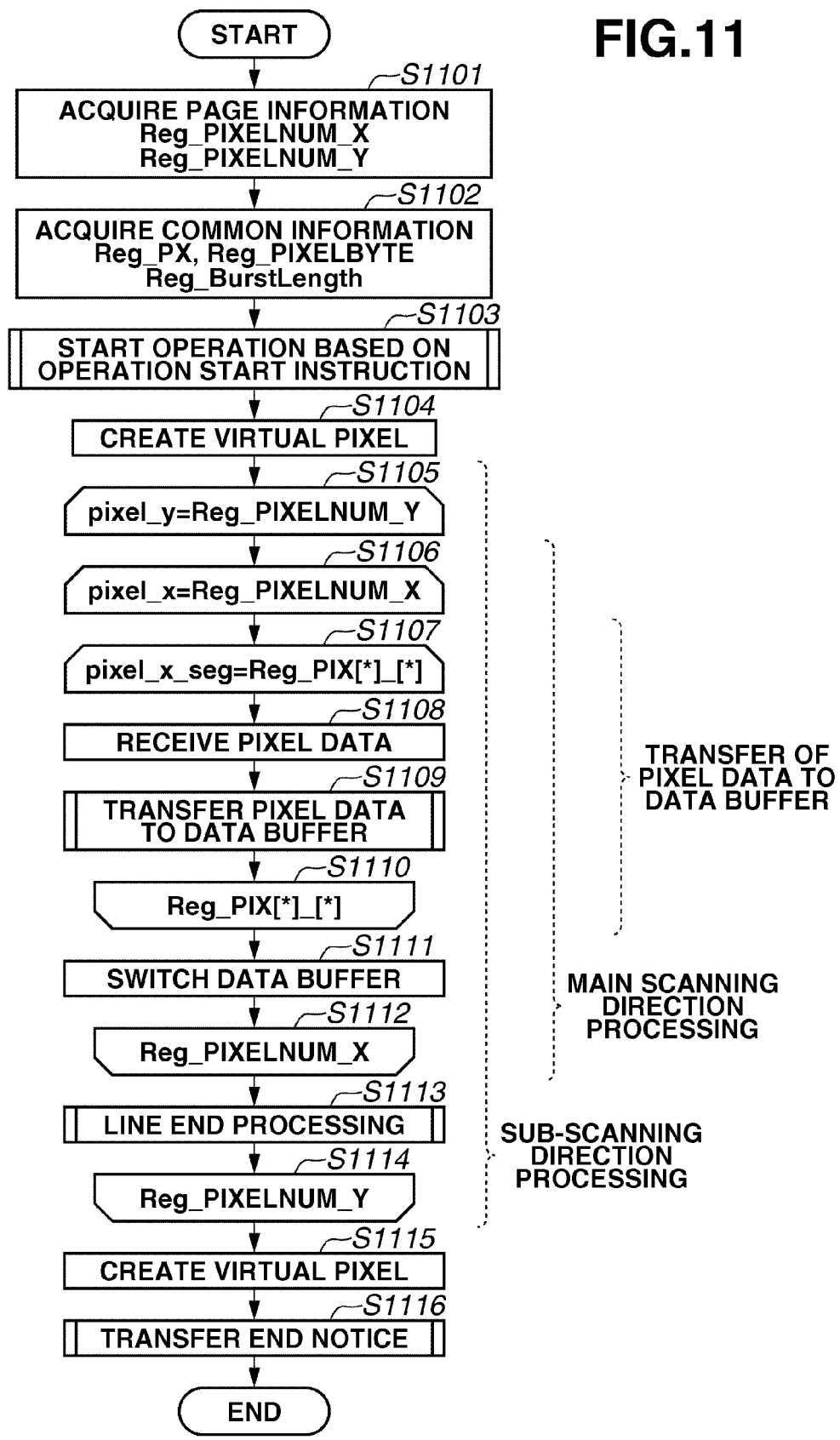
FIG. 11 is a flowchart illustrating an operation of an image data interface (I/F) of a DMA controller.
Figure 12:
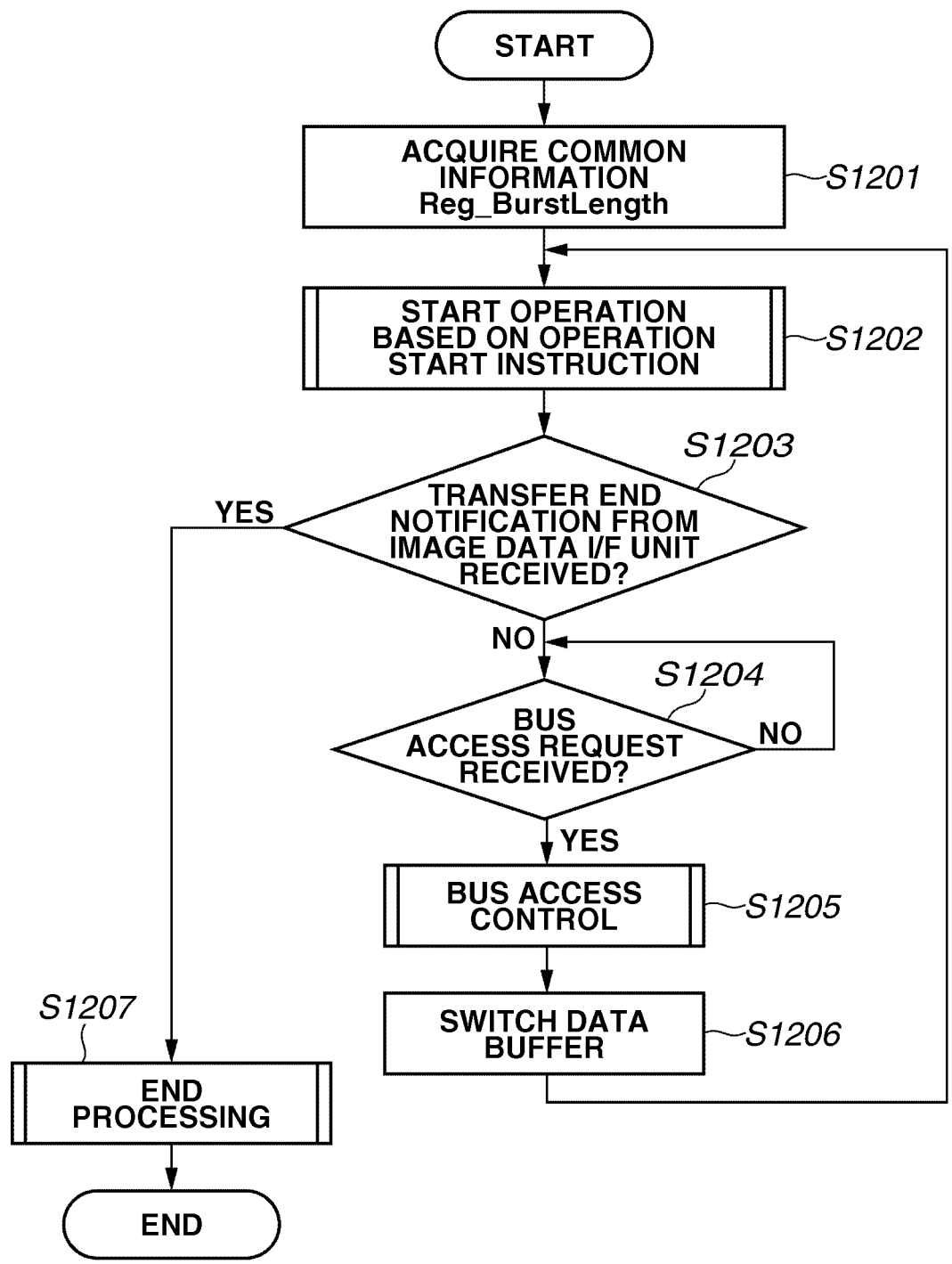
FIG. 12 is a flowchart illustrating an operation of a bus I/F unit of the DMA controller.
Figure 13:
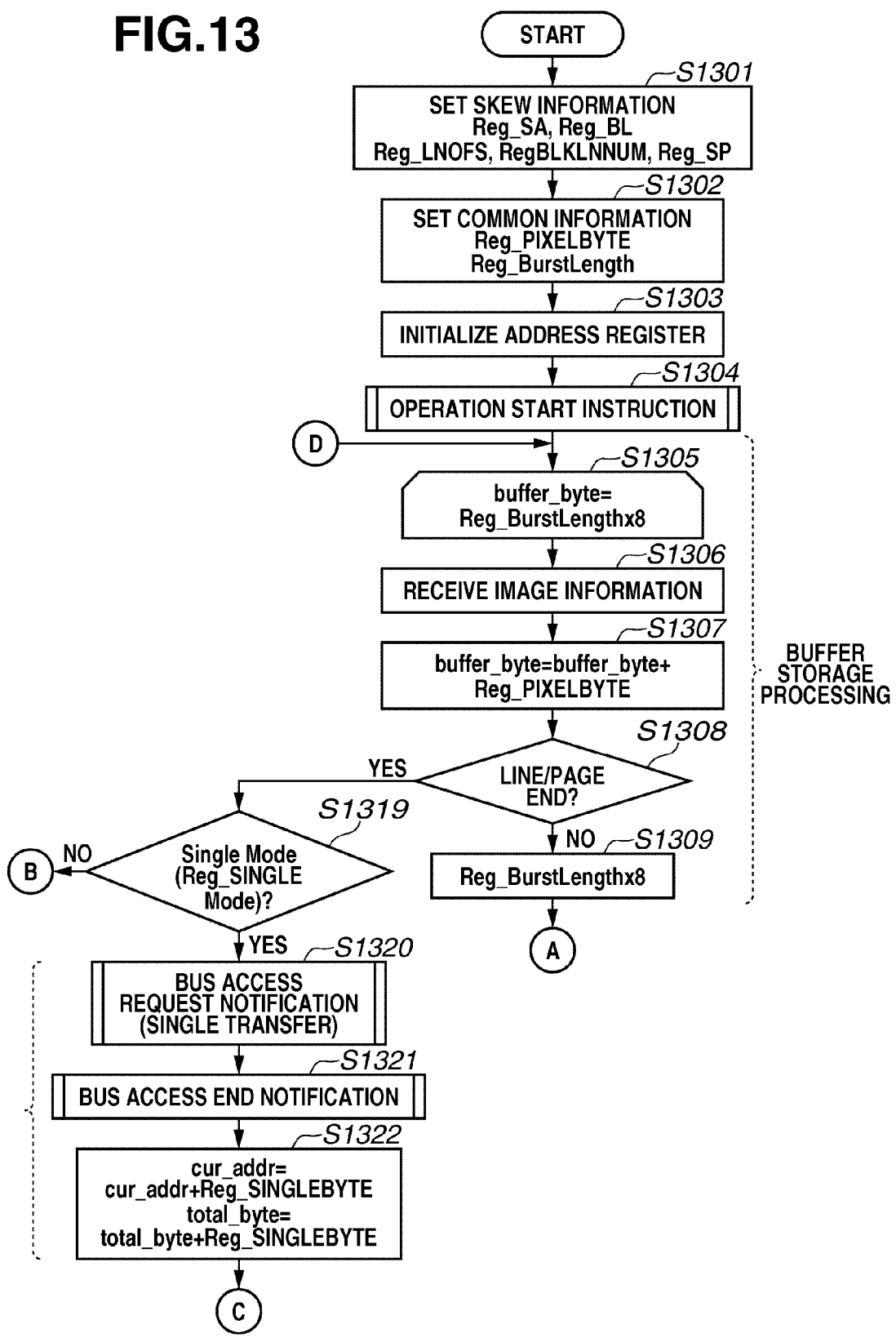
FIG. 13 is a flowchart partly illustrating an operation of a buss access information unit of the DMA controller.
Figure 14:
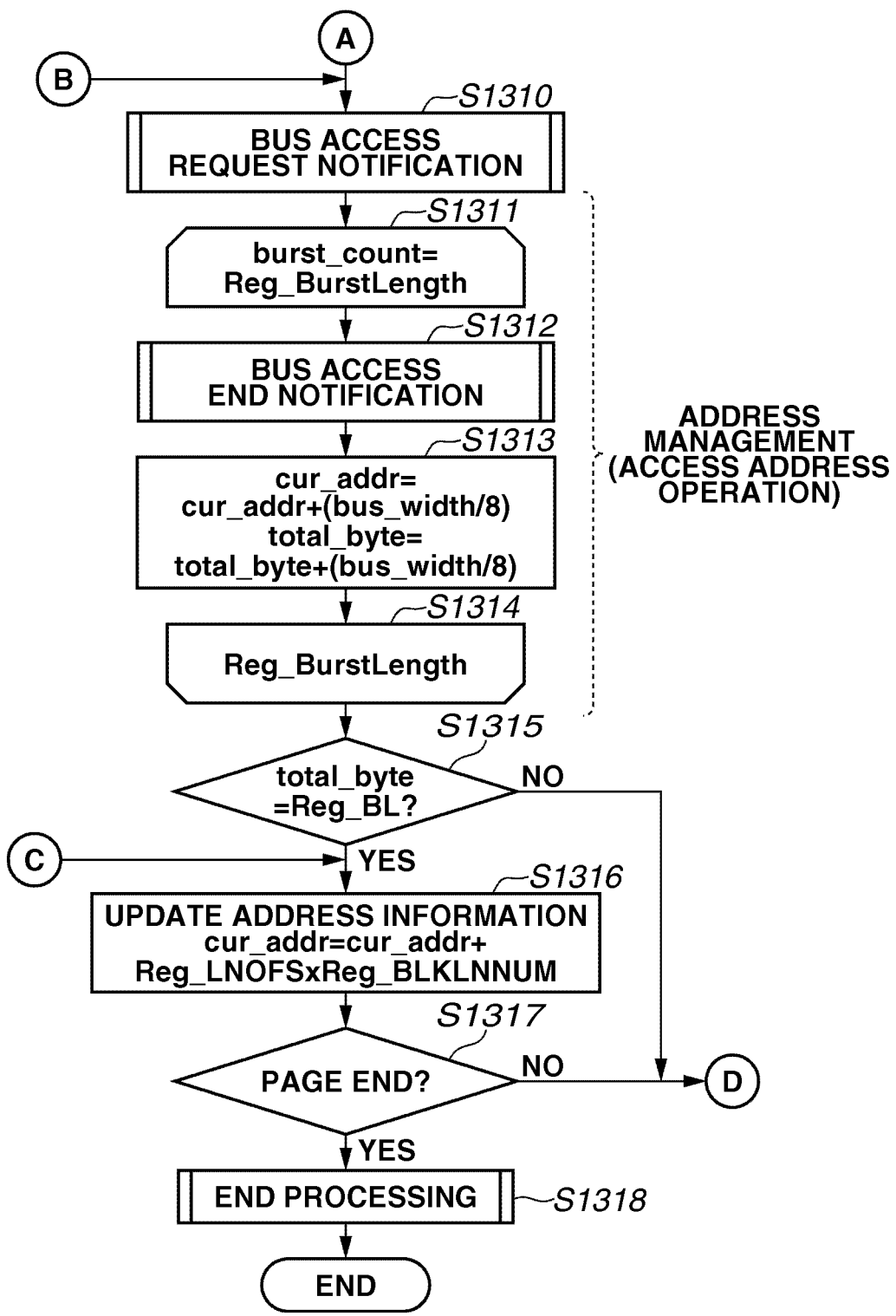
FIG. 14 is a flowchart illustrating the rest of an operation of the buss access information unit of the DMA controller.

Next, an operation of the DMA controller 301 of the DMA control unit 209 is described below by referring to FIGS. 8 through 14. FIG. 8 is a block diagram illustrating an internal configuration of the DMA controller 301 illustrated in FIG. 3 (the DMA control unit 209 illustrated in FIG. 2). FIG. 9 illustrates an example of register information set in the DMA controller 301. FIG. 10 is a flowchart illustrating a procedure for setting register information in the DMA controller 301 by the CPU 205. FIG. 11 is a flowchart illustrating an operation of the image data I/F 304 of the DMA controller 301. FIG. 12 is a flowchart illustrating an operation of the bus I/F unit 309 of the DMA controller 301. FIGS. 13 and 14 are flowcharts partly illustrating an operation of the buss access information unit 306 of the DMA controller 301.

As illustrated in FIG. 8, the DMA controller 301 has the bus access information unit 306. The bus access information unit 306 is constituted by a plurality of sets each of which includes address information, an address register, a buffer state management flag, and a data buffer. The data buffer included in each of the sets has capacity twice the burst transfer length. The address register can store address information of 1 line. According to the present embodiment, the bus access information unit 306 has 8 sets and can partly store address information of 8 lines and data of 8 lines. The data buffers (data retention units) 811 through 818 of each of the sets are Buffer0 through Buffer7. Addresses in the subscanning direction are associated with these buffers each of which stores associated pixel data based on the curve information.

It is necessary to set the curve information, which represents the curving characteristics of the scanning line, in the image printing unit 106, in the DMA controller 301 for writing image data in the image memory 203. This curve information is set in the DMA controller 301 as register information by the CPU 205. For example, information illustrated in FIG. 9 is used as the register information.

Next, a procedure for setting the register information in the DMA controller 301 by the CPU 205 is described below.

As illustrated in FIG. 10, in step S1001, curve information (corresponding to the registers Reg_SA, Reg_BL, Reg_LNOFS, Reg_BLKLNNUM, and Reg_SP) is set in the register unit 302 of the DMA controller 301. In the DMA controller 301, the curve information set in the register unit 302 is read therefrom and set in the bus I/F unit 309. Subsequently, in step S1002, the CPU 205 sets page information (corresponding to the registers Reg_PIXELNUM_X and Reg_PIXELNUM_Y) in the register unit 302. The page information set in the register unit 302 is read and set in the image data I/F unit 304. Then, the CPU 205 sets common information (corresponding to the registers Reg_PIXELNUM_X and Reg_BurstLength) in the register unit 302. The curve information, the page information and the common information can be set in an optional order.

Subsequently, in step S1004, the CPU 205 instructs the DMA controller 301 to start an operation. The DMA controller 301 instructed to start the operation operates based on the set page information by an amount corresponding to the size of an associated page. Upon completion of this operation, the DMA controller 301 gives an end notification to the CPU 205.

Then, in step S1005, the CPU 205 waits for receiving the end notification from the DMA controller 301. In step S1006, upon receiving the end notification, the DMA controller 301 performs the end processing. Subsequently, the CPU 205 finishes the present processing.

Next, an operation of the image data I/F unit 304 of the DMA controller 301 is described below.

As illustrated in FIG. 11, in steps S1101 and S1102, the image data I/F unit 304 acquires the page information and the common information, among various types of the information set in the register unit 302 by the CPU 205, as information necessary for controlling an operation of writing image data, respectively. Then, in step S1103, the image data I/F unit 304 starts performing an operation, based on the instruction sent from the CPU 205 in step S1004. The image data I/F unit 304 is put into a state, in which the image data I/F unit 304 can receive image data, by starting this operation.

Then, in step S1104, the image data I/F unit 304 creates virtual pixels corresponding to a leading line of the page. These virtual pixels are created based on the value indicated by the register Reg_PX[*]. Data representing these pixels is transferred to the data buffer unit 307.

Regarding a first line, data respectively representing a total of 30 pixels (created based on the following values of the registers, i.e., Reg_PX0=5, Reg_PX1=4, Reg_PX2=6, Reg_PX3=7, and Reg_PX4=8) is output to the data buffer of a first set of the bus access information unit 306. Subsequently, when it is confirmed that Reg_SP4=1, virtual pixels corresponding to a second line are created. Regarding the second line, data respectively representing a total of 22 pixels (created based on the following values of the registers, i.e., Reg_PX0=5, Reg_PX1=4, Reg_PX2=6, and Reg_PX3=7) is output to the data buffer of a second set thereof. Regarding a third line, data respectively representing a total of 15 pixels (created based on the following values of the registers, i.e., Reg_PX0=5, Reg_PX1=4, and Reg_PX2=6) is output to the data buffer of a third set thereof. Regarding a fourth line, when it is confirmed that Reg_SP1=2, data representing a total of 9 pixels (created based on the following values of the registers, i.e., Reg_PX0=5, and Reg_PX1=4) is output to the data buffer of a fourth set thereof. Regarding a fifth line, data representing a total of 9 pixels is output to the data buffer of a fifth set thereof, similarly to the case of the fourth line. Regarding a sixth line, when it is confirmed that Reg_SP0=2, data representing 5 pixels (based on the value of the register Reg_PX0=5) is output to the data buffer of a sixth set thereof. Regarding a seventh line, data representing 5 pixels is output to the data buffer of a seventh set thereof, similarly to the case of the sixth line.

From an eighth line, processing in a loop consisting of steps S1105 through S1114 is performed. The processing in this loop includes processing in a loop consisting of steps S1106 through S1112 and processing in a loop consisting of steps S1107 through S1110. The processing in the loop consisting of steps S1105 through S1114 corresponds to the subscanning direction. The processing in the loop consisting of steps S1006 through S1112 corresponds to the main scanning direction.

In the processing in the loop corresponding to the main scanning direction, in step S1108, the image data I/F unit 304 receives pixel data of a predetermined number of pixels, which is indicated by scanning-line-change pixel number information Reg_PIX[*]. Then, in step S1109, this pixel data is transferred to an associated data buffer.

Upon completion of transferring the pixel data of the predetermined number of pixels in step S1110, in step S1111, the data buffer serving as a destination of the transfer of the pixel data is changed. Then, processing performed in step S1106 or later is repeated again.

When the data of 1 line is received in step S1112, in step S1113, line end processing in the main scanning direction is performed. Then, control returns to step S1105 again, in which processing is performed on the next line.

Thus, when the loop processing corresponding to the sub-scanning direction is finished in step S1114, in step S1115, virtual pixels at a page end part are created. The creation of the virtual pixels is performed in an order reverse to the order in which the virtual pixels at the leading part of the page are created. Then, buffer data of all lines is transferred to the memory. Upon completion of creating virtual pixels at the page end part, in step S1116, the image data I/F unit 304 notifies the bus interface unit 309 of the transfer end. Then, the processing is finished.

Thus, the image data I/F unit 304 performs the scanning-line-change by switching the buffer serving as the destination of the transfer. In addition, the image data I/F unit 304 manages the address of each buffer, to which the data is written. Consequently, there is no need for performing a complex memory address control operation.

Next, an operation of the bus I/F unit 309 is described below.

The bus I/F unit 309 performs selection of transfer data and control of a bus protocol. As illustrated in FIG. 12, in step S1201, the bus I/F unit 309 acquires common information (corresponding to the register Reg_BurstLength) from the information set in the register unit 302 as information associated with the control of the bus protocol. Then, in step S1202, the bus I/F unit 309 starts an operation based on the operation start instruction sent from the CPU 205 in step S1004.

Figure 16:
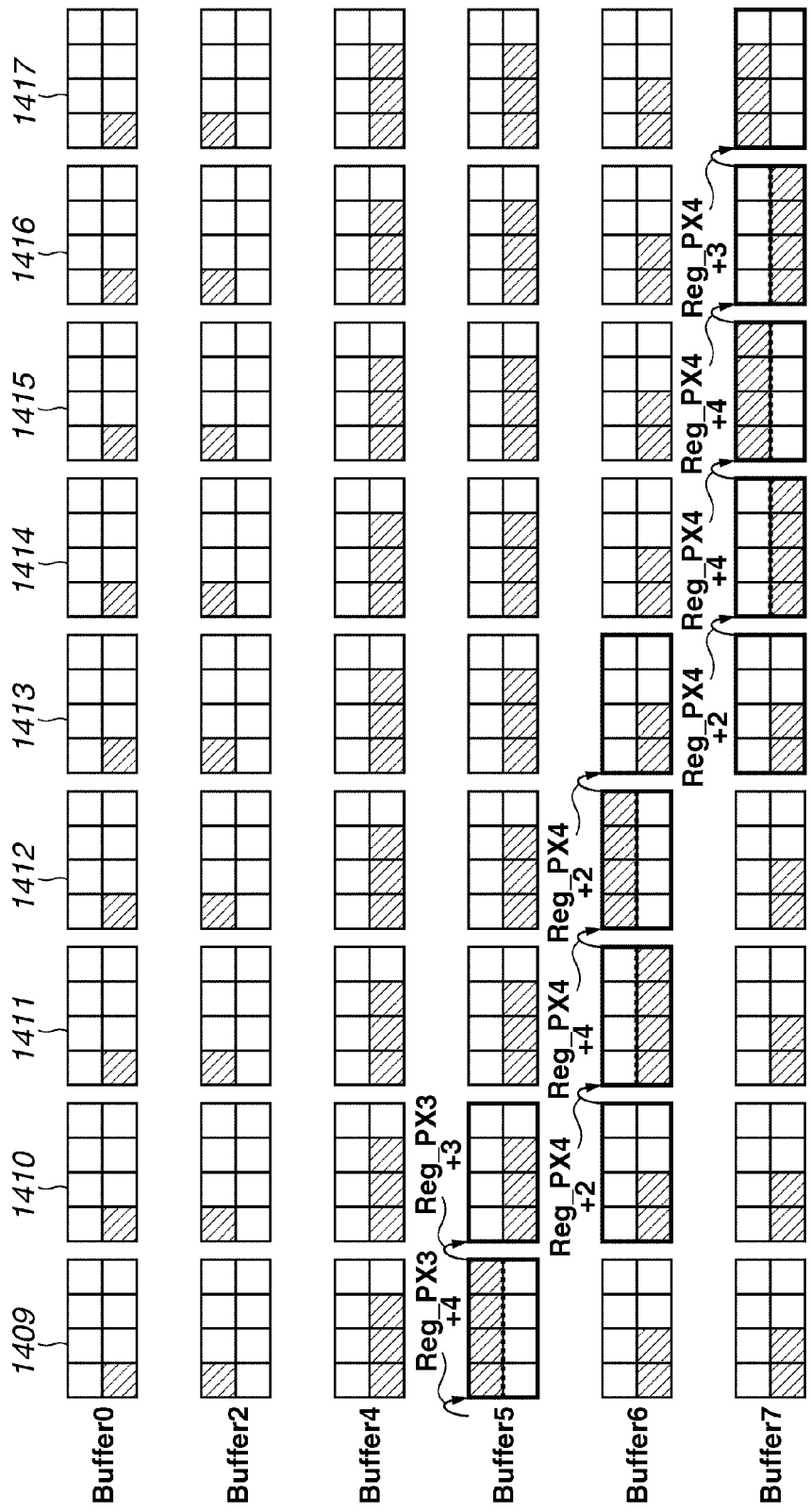
FIG. 16 schematically illustrates the transition state of data in each data buffer of the data buffer unit.

Subsequently, in step S1203, the bus I/F unit 309 determines whether the bus I/F unit 309 receives a transfer end notification from the image data I/F unit 304. Thus, if the bus I/F unit 309 does not receive a transfer end notification from the image data I/F unit 304 (NO in step S1203), in step S1204, the bus I/F unit 309 waits for a bus access request (write request) from the bus access information unit 306. When image data of the maximum storable number of pixels in each of the buffers (Buffer0 through Buffer7) which is described below with reference to FIG. 16 is stored therein, the bus access information unit 306 determines that the buffers are in a full state. Then, this bus access request (write request) is issued.

When receiving the bus access request in the above step S1204, in step S1205, the bus I/F unit 309 performs a bus access control operation. Upon completion of the above bus access control operation, in step S1206, the bus I/F unit 309 switches the data buffer serving as the destination of the transfer. Then, the bus I/F unit 309 returns to step S1203.

When receiving a transfer end notification from the image data I/F unit 304, in step S1207, the bus I/F unit 309 performs end processing. Thus, the present process is finished. In the end processing, e.g., the bus I/F unit 309 sends an end notification (corresponding to step S1005) to the CPU 205.

Next, an operation of the bus access information unit 306 is described below.

The bus access information unit 306 manages current address information (cur_addr) of each of scanning lines, among which scanning-line-change is performed, and a total amount (total_byte) of transmitted data among data of 1 line.

As illustrated in FIG. 13, in step S1301, the bus access information unit 306 acquires the curve information set by the CPU 205. In step S1302, the bus access information unit 306 acquires common information. Then, in step S1303, the bus access information unit 306 initializes the address register. Actually, a leading address of each line is calculated based on the values of the registers Reg_SA, Reg_LNOFS, Reg_BLKNUM, and Reg_SP. Thus, the value of the address register is determined.

Next, in step S1304, the bus access information unit 306 starts performing an operation based on the operation start instruction sent from the CPU 205. In steps S1305 through S1309, the bus access information unit 306 confirms the state of the data buffer unit 307. That is, a signal wr_en (see FIG. 8) is asserted. The received pixel data is stored in the data buffer unit 307. Then, a buffer capacity value (buffer_byte) is counted up. Processing performed from step S1305 is repeated until the counted-up value reaches a burst transfer length in step S1308.

When pixel data of the burst transfer length is stored in the data buffer unit 307, in step S1312, the bust access information unit 306 notifies the bus I/F unit 309 of a bus access end (buf_req), as illustrated in FIG. 14. Then, in step S1313, each time data transfer with a data bit width (64 bits according to the present embodiment) of the bus I/F is completed, the bus access information unit 306 calculates the address value in the image memory 203 and a total amount of transmitted data in 1 line.

Subsequently, in step S1314, the bus access information unit 306 determines whether the total amount (total_byte) of transmitted data is equal to the value of the register Reg_BL. If the total amount (total_byte) of transmitted data is equal to the value of the register Reg_BL, in step S1315, the bus address information unit 306 updates address information. The leading address of the next block is calculated by adding a value Reg_LNOFS×Reg_BLKLNNUM to the value represented by the current address information (cur_addr) Thus, the address information is updated.

Then, in step S1316, the bus access information unit 306 determines whether a page is ended. If the page is not ended, control returns to the above step S1305.

Sometimes, a line end or a page end occurs during the reception of pixel data. Thus, in step S1308, the bus access information unit 306 determines whether a line end or a page end occurs during the reception of pixel data. If a line end or a page end occurs during the reception of pixel data, in step S1309, the bus access information unit 306 determines whether a single mode is set. If the single mode is set (YES in step S1309), in step S1320, the bus access information unit 306 makes a bus access transfer request. In step S1321, the bus access information unit 306 notifies a bus access end (buf_done).

Then, in step S1322, the bus access information unit 306 calculates the address value in the image memory 203 and the total amount of transmitted data in 1 line. Then, the bus access information unit 306 proceeds to step S1315 in which the address information is updated.

Figure 15:
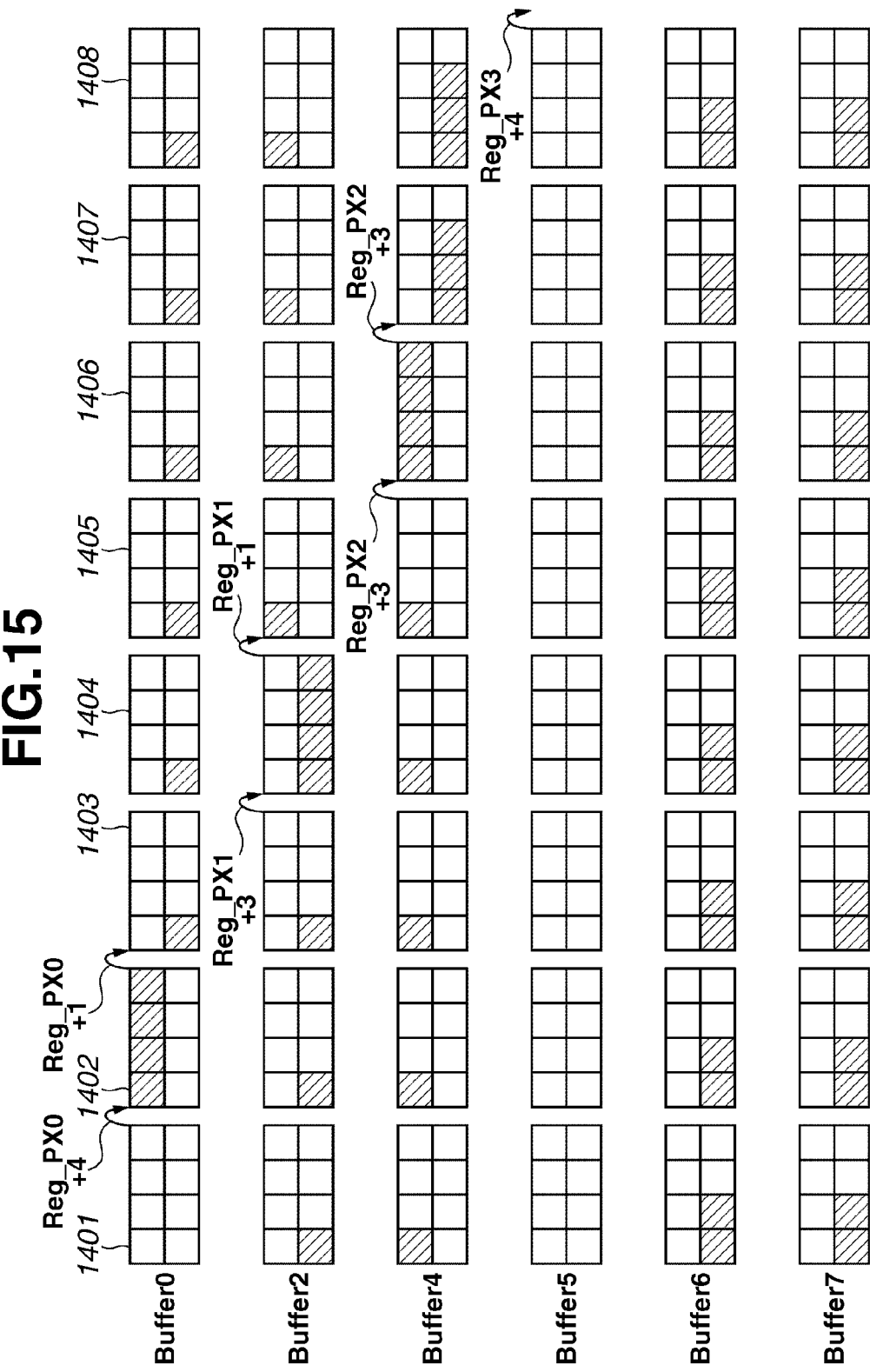
FIG. 15 schematically illustrates a transition state of data in each data buffer of a data buffer unit.

Next, the transition of data in each data buffer of the data buffer unit 307 is described below with reference to FIGS. 15 and 16. FIGS. 15 and 16 schematically illustrate a transition state of data in each data buffer of the data buffer unit 307. In FIGS. 15 and 16, hatched parts represent portions that store data. According to the present embodiment, it is assumed that a data size of one pixel is 8 bytes, and that a burst transfer size is 32 bytes (corresponding to 4 pixels).

As illustrated in FIG. 15, at completion of creation of virtual pixels (1401), data remain in the buffers Buffer2 and Buffer4 of the data buffer unit 307.

First, data representing 5 pixels set in the register Reg_PX0 are input to the buffer Buffer0. At that time, when data representing 4 pixels are input (1402), burst transfer can be performed. Then, a bus access request to the bus I/F unit 309 is made. When data representing the last one pixel is input to the buffer Buffer0, the image data I/F unit 304 switches a data path. At that time, the value of the register Reg_SP0=2. Thus, the data path is changed to the buffer Buffer2 by skipping the buffer Buffer1.

After repetition of the above process, as illustrated in FIGS. 15 and 16, the state of each of the registers Reg_PX[*] is set as follows: Reg_PX1 (1404, 1405), Reg_PX2 (1405-1407), Reg_PX3 (1408-1410), Reg_PX4 (1410-1413), and Reg_PX5 (1414-1417).

When data of the burst transfer amount is stored in the buffers, a memory access is made. Pixel data remaining when the image data I/F unit 304 changes the data path is stored therein until pixel data of the next line is input to the data buffer unit 307.

Thus, image data enabling the correction of the curve of the scanning line, which appears in the image printing unit 106, can be output to the image printing unit 106 by repeating the above operation.

The DMA controller 301 is constituted by the image data I/F unit 304 and the bus access information unit 306 to perform a simplified scanning-line-changing operation. Consequently, deflection of an image due to the curving of the scanning line, which appears in the image printing unit 106, can be corrected without complexifying a control operation of the DMA controller 301. Accordingly, misregistration due to the curving of the scanning line can be prevented from occurring when images of color components are superposed in the image printing unit 106.

In addition, according to the present embodiment, memory access other than processing of a page end in the single access mode is performed only in the burst transfer mode. Thus, a system can be constructed, which maximizes memory access efficiency.

Next, a second exemplary embodiment of the present invention is described hereinafter with reference to FIGS. 17A, 17B and 18. FIG. 17A illustrates an example of a curve of an image when the curve of a scanning line at an image printing unit 106 is corrected in the second exemplary embodiment of the present invention. FIG. 17B schematically illustrates image data written to the image memory 203 by the DMA controller 301 according to the curve of the image illustrated in FIG. 17A.

Figure 18:
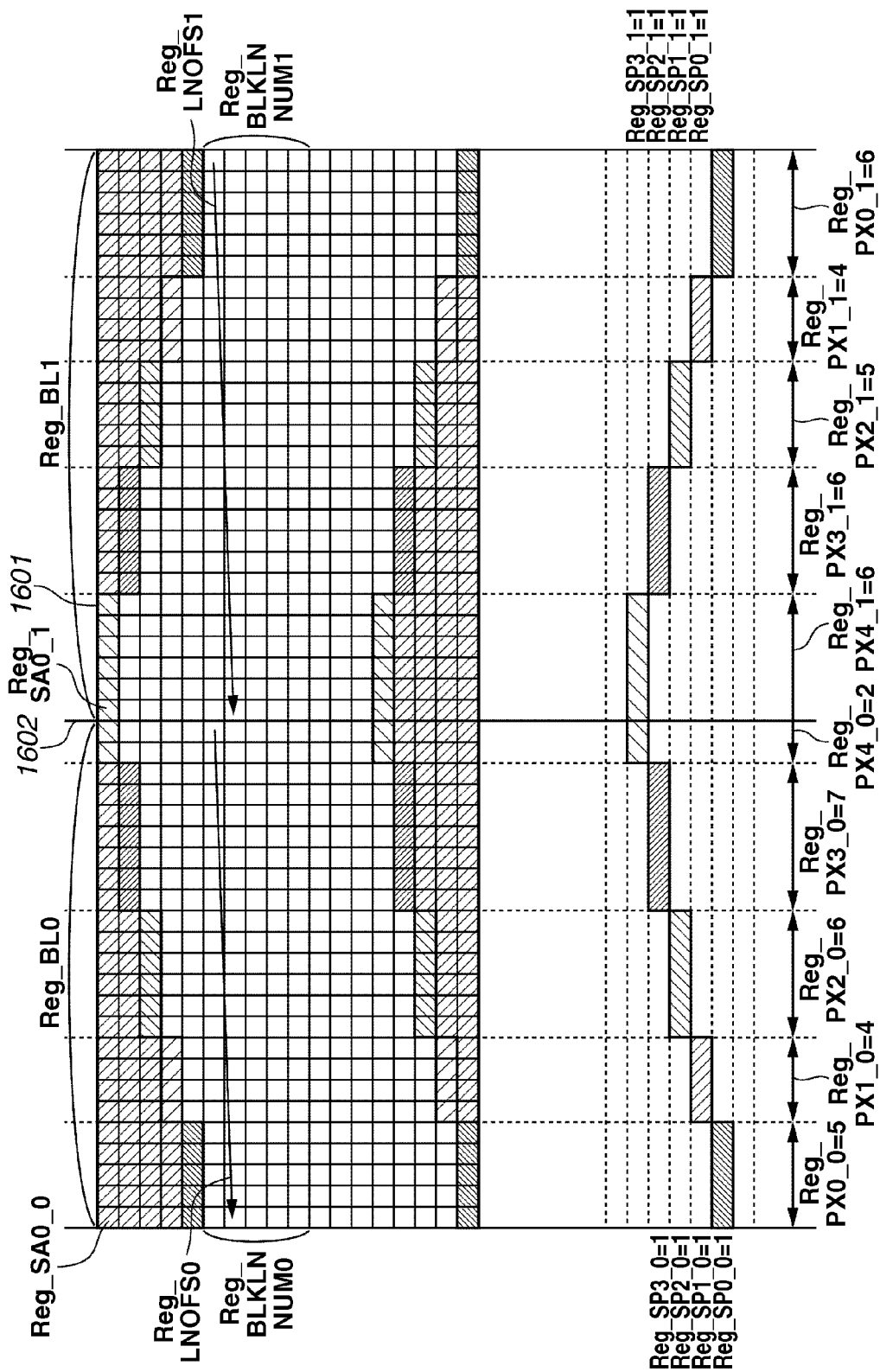
FIG. 18 illustrates register information set in order to obtain the curve of the image, which is illustrated in FIGS. 17A and 17B.

FIG. 18 illustrates register information to be set in order to obtain the curve of the image, which is illustrated in FIGS. 17A and 17B.

When the curve of the scanning line in the image printing unit 106 represents a quadratic curve, image data is written by the DMA controller 301 to the image memory 203 so as to represent an image curved (like a quadratic curve) in a direction in which the effects of the curving of the scanning line are canceled out by the curve of the image. That is, the image data is written to the image memory 203 so as to represent an image having a curve (represented by a quadratic curve) as illustrated in FIGS. 17A and 17B.

When image data is written to the image memory 203 as described above, register information illustrated in FIG. 18 is set in the register unit 302. More specifically, an image is divided in two parts at a point 1601, at which the sign of the gradient of a tangent of the curve changes. Then, the register information is set corresponding to this point. For example, when there are a plurality of points at which the sign of the gradient of a tangent of the curve changes, the number of the plurality of points is set as the value of the register Reg_WNDPNT (not shown). It is advisable to set information representing this value of the register Reg_WNDPNT as the register information.

When the image is divided into two parts, it is necessary to set a pixel located on a burst length straight-line, e.g., a central point 1602 as an image division point (represented by the value of the register Reg_SA0_1). According to the present embodiment, a total of 24 pixels (data size of each single pixel is 8 bytes) from Reg_PX0 through Reg_PX4 are located on the straight-line. However, when the address of the image division point corresponding to the value of the register Reg_SA0_1 is not adjusted, a blank data area is generated in the divided part.

Thus, the number of places, at each of which the register information is set, and data buffers (of the bus access information unit 306) is twice the maximum number of the lines among which a scanning line is switched. Consequently, it is useful to set an initial value at each address register according to the value of the register Reg_WNDPNT in a step of performing initialization of each bus access information unit 306. After that, an operation of controlling image data using the bus I/F unit 302 and the image data I/F unit 304, which is performed in the subsequent step, is similar to that in the above first exemplary embodiment.

Figure 19:
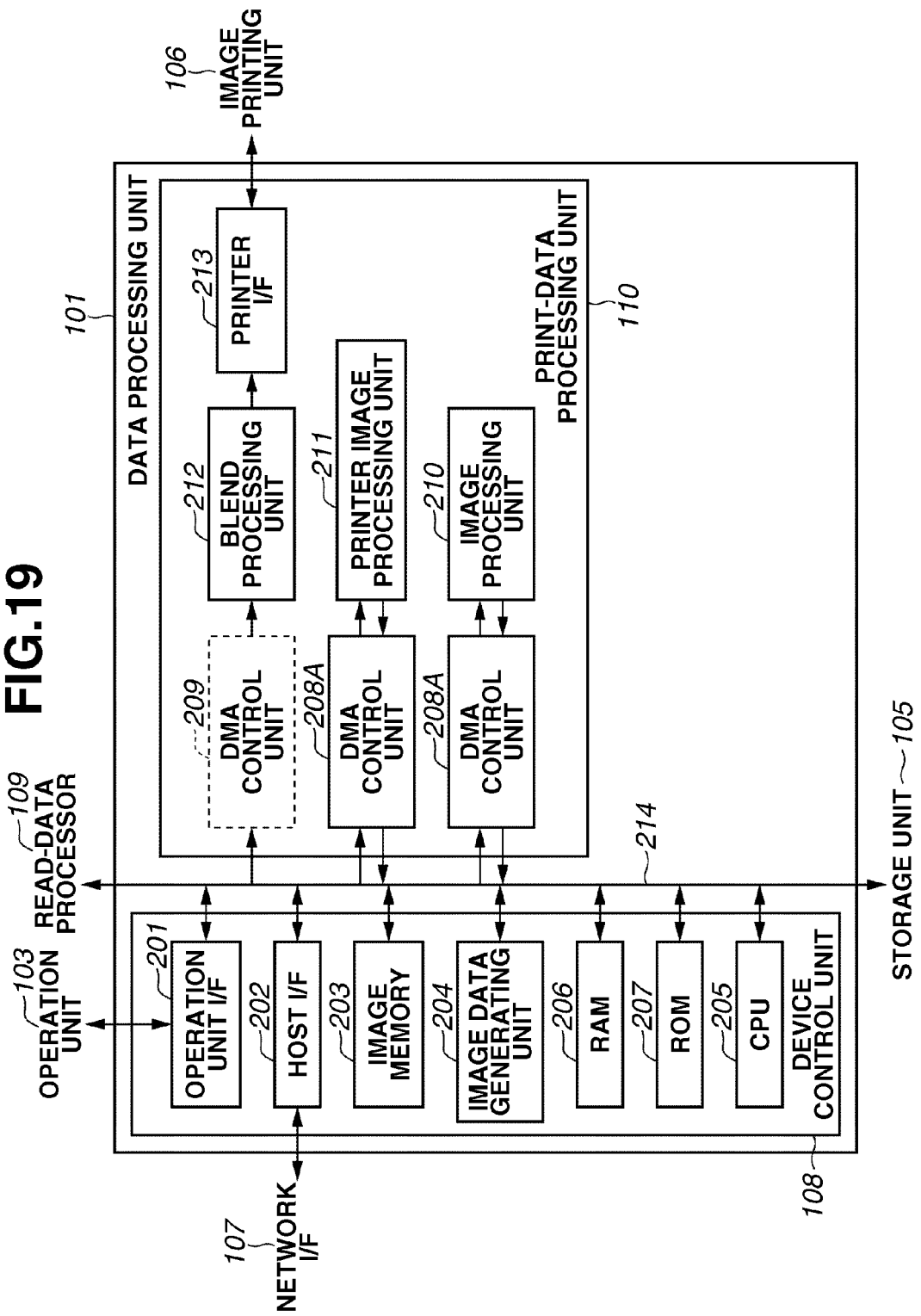
FIG. 19 is a block diagram illustrating a configuration of a data processing unit of an image forming apparatus according to a third exemplary embodiment of the present invention.
Figure 20:
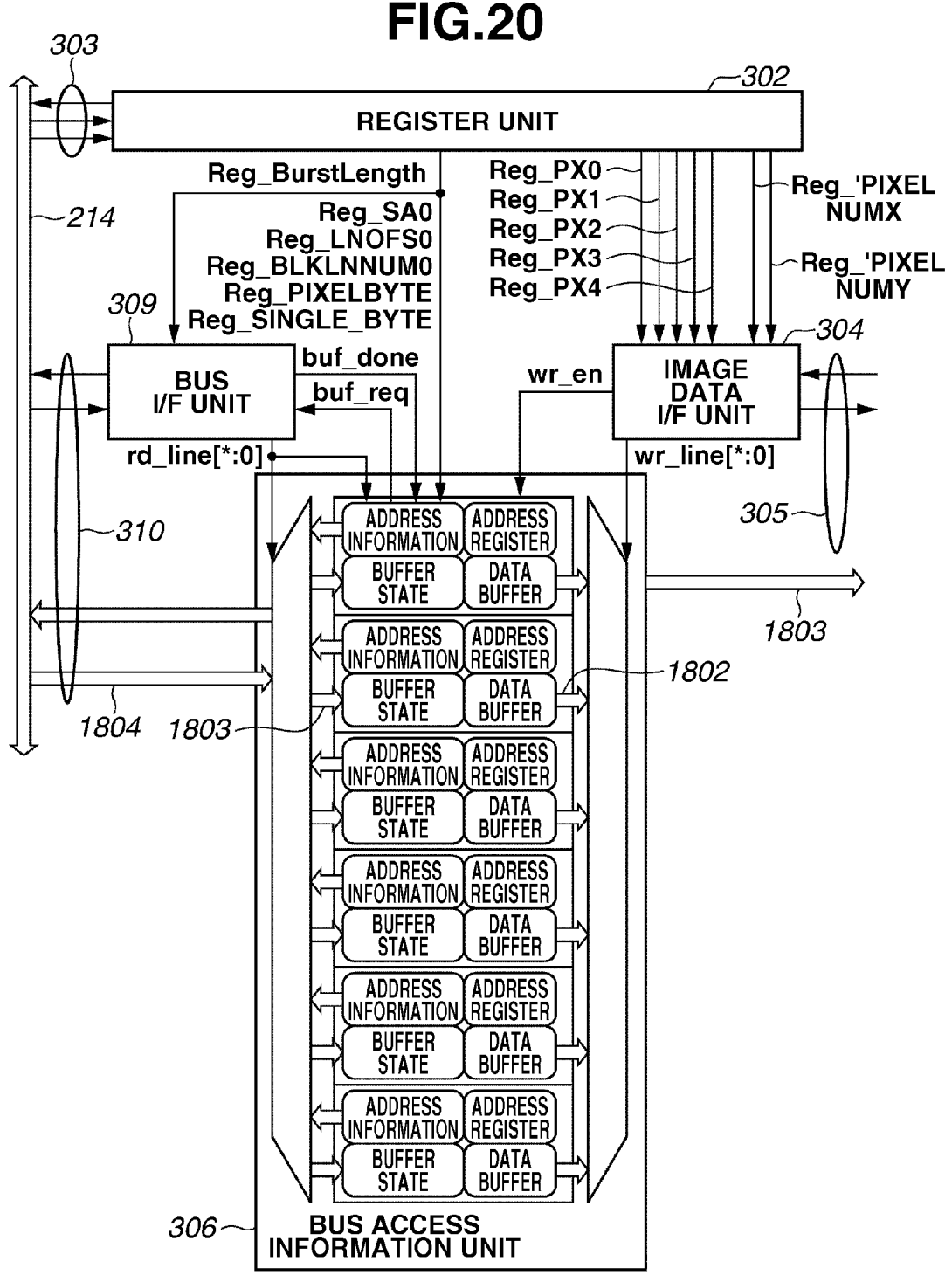
FIG. 20 is a block diagram illustrating a configuration of a DMA control unit illustrated in FIG. 19.
Figure 21:
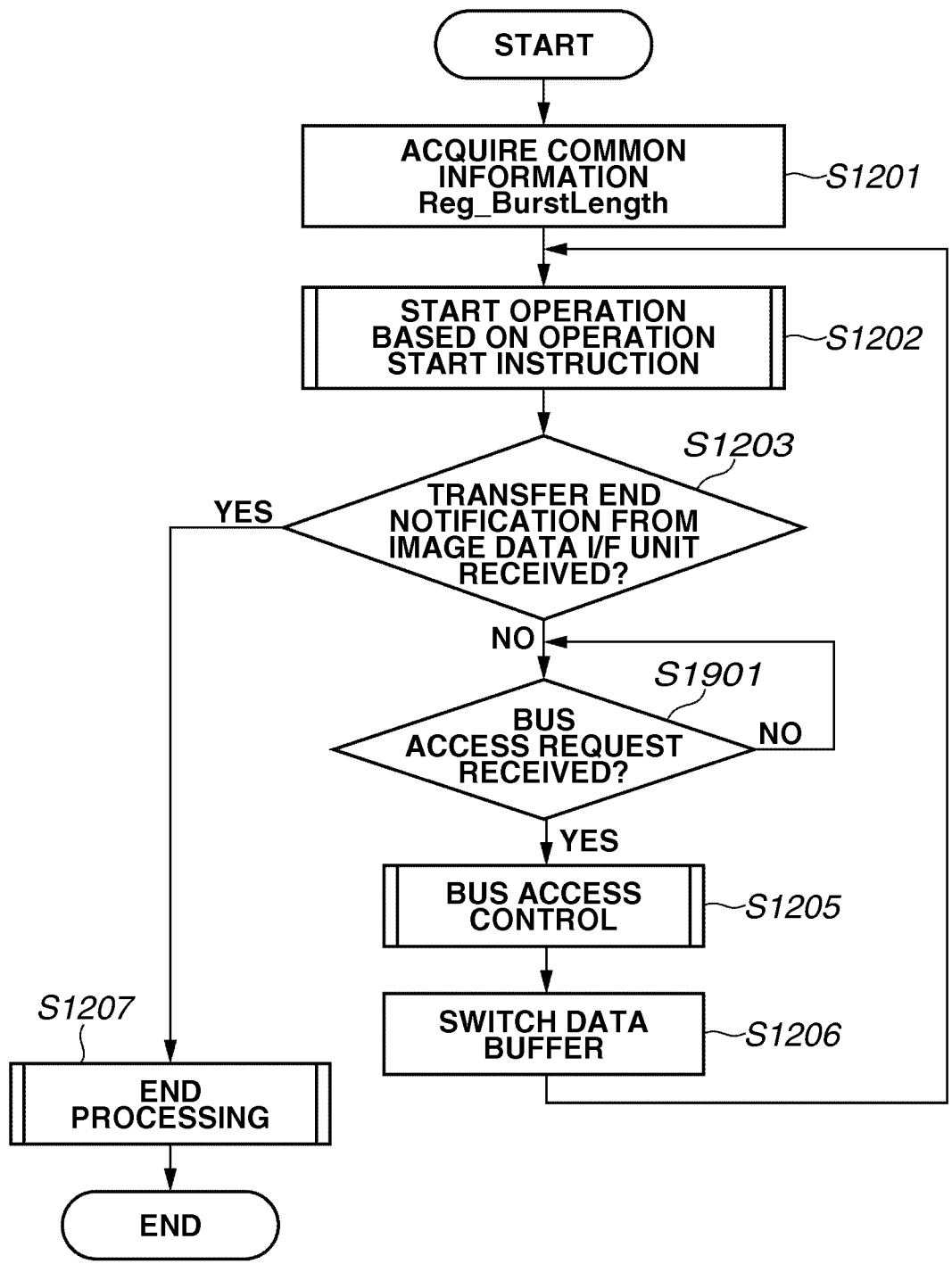
FIG. 21 is a flowchart illustrating a procedure for performing an operation of a bus I/F.
Figure 22:
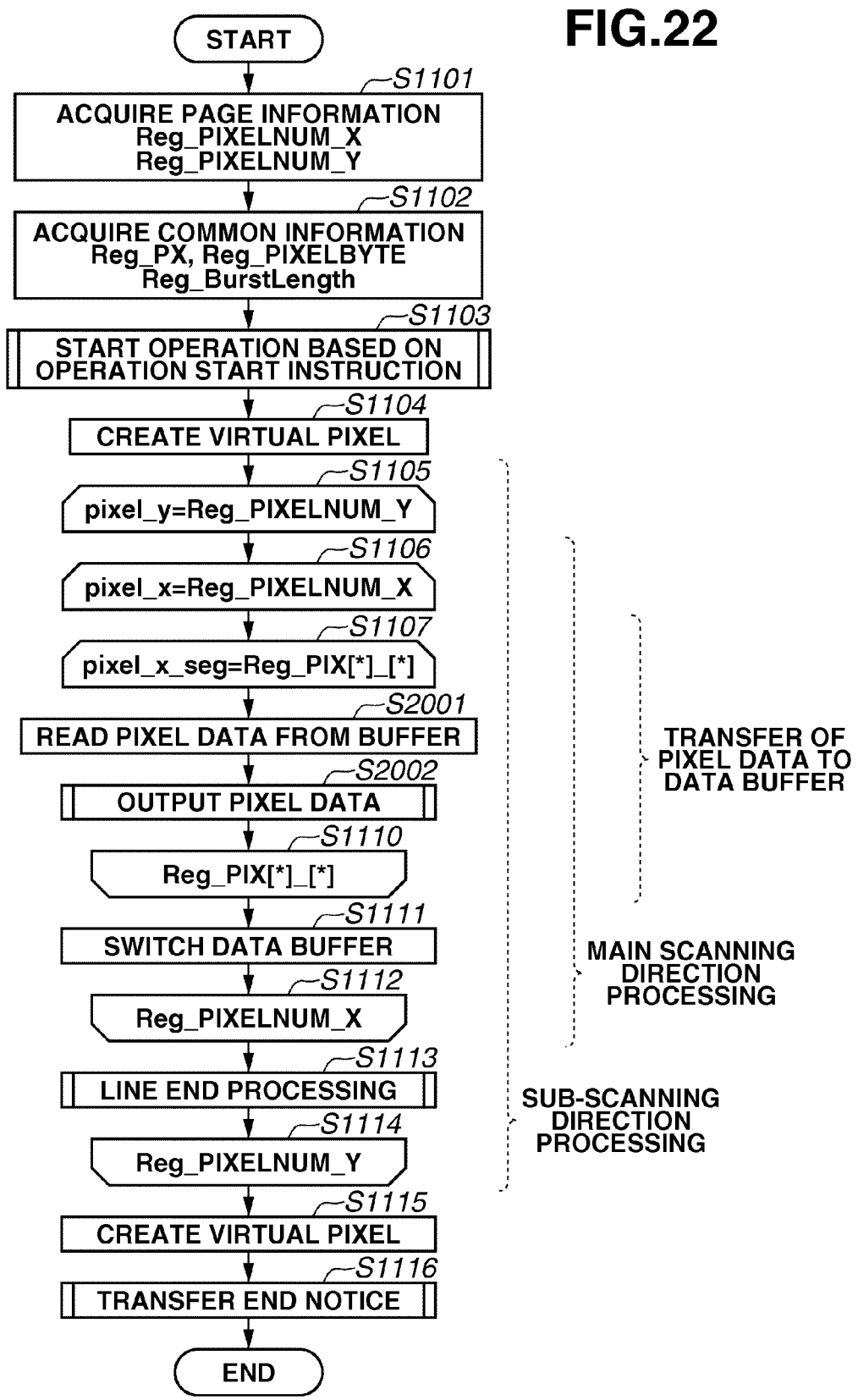
FIG. 22 is a flowchart illustrating a procedure for performing an operation of an image data I/F unit.
Figure 23:
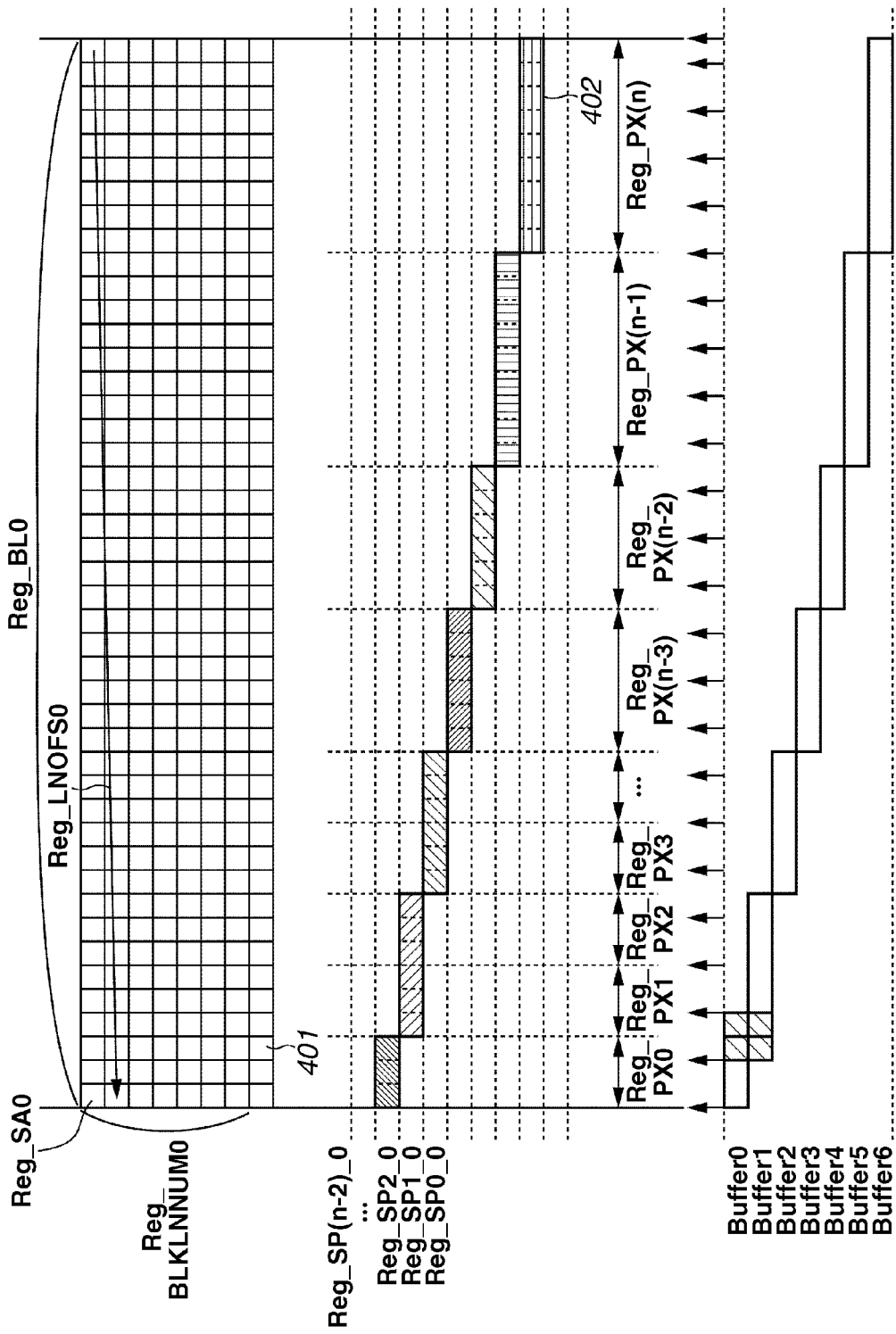
FIG. 23 illustrates differences between the first exemplary embodiment and the third exemplary embodiment of the present invention.

Next, a third exemplary embodiment of the invention is described hereinafter with reference to FIGS. 19 through 23. FIG. 19 is a block diagram illustrating a configuration of a data processing unit of an image forming apparatus according to a third exemplary embodiment of the present invention. FIG. 20 is a block diagram illustrating a configuration of a DMA control unit 209 in FIG. 19. FIG. 21 is a flowchart illustrating a procedure for performing an operation of a bus I/F unit 309. FIG. 22 is a flowchart illustrating a procedure for operating an image data I/F unit 304. FIG. 23 illustrates differences between the first exemplary embodiment and the third exemplary embodiment of the present invention. In these drawings, blocks which are the same as those of the first exemplary embodiment are designated by identical reference numerals. Thus, duplicate description thereof is omitted.

As illustrated in FIG. 19, the DMA control unit 209 is arranged in the data processing unit 101 of the present embodiment. The DMA control unit 209 is provided with a DMA controller 301 for reading image data from an image memory 203. In this respect, the present embodiment differs from the first exemplary embodiment.

According to the present embodiment, image data processed by a printer image processing unit 211 is assumed to be written to the image memory 203 to be arranged therein like a rectangle (see FIG. 7A), instead of being arranged therein to have a curve corresponding to the curve of the scanning line. In this case, the DMA controller 301 reads image data from the image memory 203 while changing a read address in a direction indicated by an arrow 705. Then, the read image data is output to a blend processing unit 212. Thus, the blend processing unit 306 can perform blend processing on the read image data by reading the image data while changing a read address. Consequently, necessity for line buffers is eliminated.

As is understood from FIG. 20, the DMA controller 301 according to the present embodiment differs from the DMA controller 301 of the first exemplary embodiment in that the direction of the data path of the DMA controller 301 is opposite to the direction of the data path of the DMA controller 301 according to the first exemplary embodiment.

As illustrated in FIG. 21, the bus I/F unit 309 according to the third exemplary embodiment differs from the bus I/F unit 309 (see FIG. 12) according to the first exemplary embodiment in that in step S1901, the bus I/F unit 309 waits for a bus access request (read request) from the bus access information unit 306. This bus access request (read request) is issued when the buffer is in an empty state in the bus access information unit 306.

As described above, the direction of the data path 1801 of the DMA controller 301 according to the third exemplary embodiment is opposite to that of the data path according to the first embodiment. Thus, as illustrated in FIG. 22, an operation of the image data I/F unit 304 according to the third exemplary embodiment differs from that of the image data I/F unit 304 according to the first exemplary embodiment (see FIG. 11) in that image data from the buffer is read in step S2001, and that pixel data is output in step S2002.

The DMA controller 301 for reading image data according to the third exemplary embodiment is similar to the DMA controller 301 for writing image data according to the first exemplary embodiment in the address control by the bus access information unit 306. The control of the data buffer unit 307 in the DMA controller 301 according to the third exemplary embodiment differs from that of the data buffer unit 307 in the DMA controller 301 according to the first exemplary embodiment only in that the control of the data buffer unit 307 in the DMA controller 301 according to the third exemplary embodiment is performed on an operation of reading the data from the buffer, while the control of the data buffer unit 307 in the DMA controller 301 according to the third exemplary embodiment is performed on an operation of writing the data to the buffer.

Next, the difference between the writing DMA controller according to the first exemplary embodiment and the reading DMA controller according to the third exemplary embodiment is described hereinafter with reference to FIG. 23. In a case where the burst transfer amounts are indicated by arrows in FIG. 23, at e.g., the buffer Buffer0 and the buffer Buffer1, there is a discrepancy between a scanning-line-change position and the number of burst-transferred pixels. Thus, as indicated by a hatched part at each of the buffers Buffer0 and Buffer1, in a case where the data to be burst-transferred includes a scanning-line-change boundary position, the pixel at the same position in the main scanning direction is redundantly read. That is, data of four pixels are transferred from the memory to the buffer Buffer0. The image data I/F unit 304 reads data of the three pixels thereamong and transfers the read data to the blend processing unit. At that time, the image data I/F unit 304 discards the data of the remaining one pixel. Subsequently, the image data I/F unit 304 switches the buffer Buffer0 to the buffer Buffer1. Then, the image data I/F unit 304 reads data stored in the buffer Buffer1 by reading the data of second through fourth pixels stored in this buffer without reading the data of a first pixel stored in this buffer.

Figure 24:
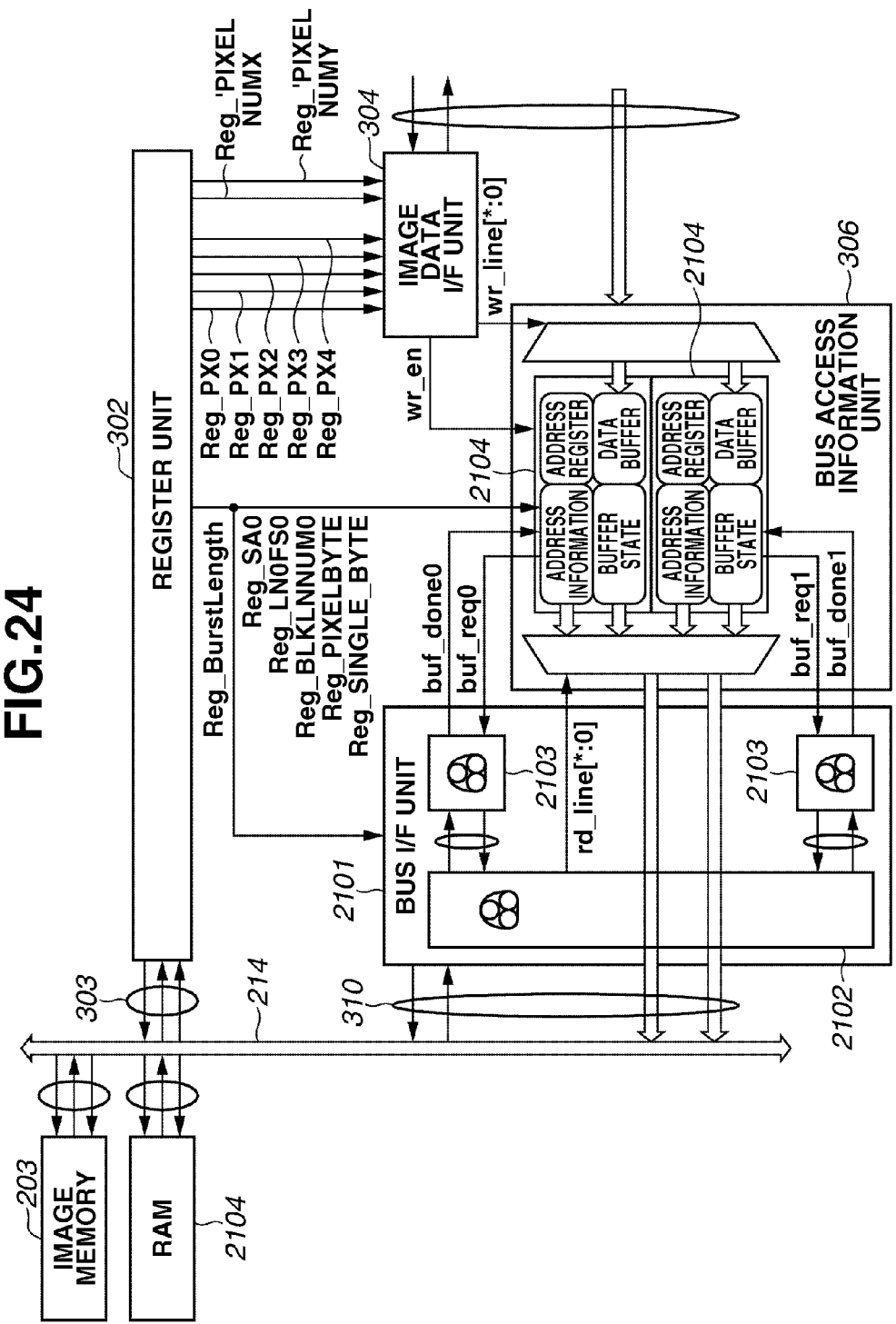
FIG. 24 is a block diagram illustrating a DMA controller of an image forming apparatus according to a fourth exemplary embodiment of the present invention.
Figure 25:
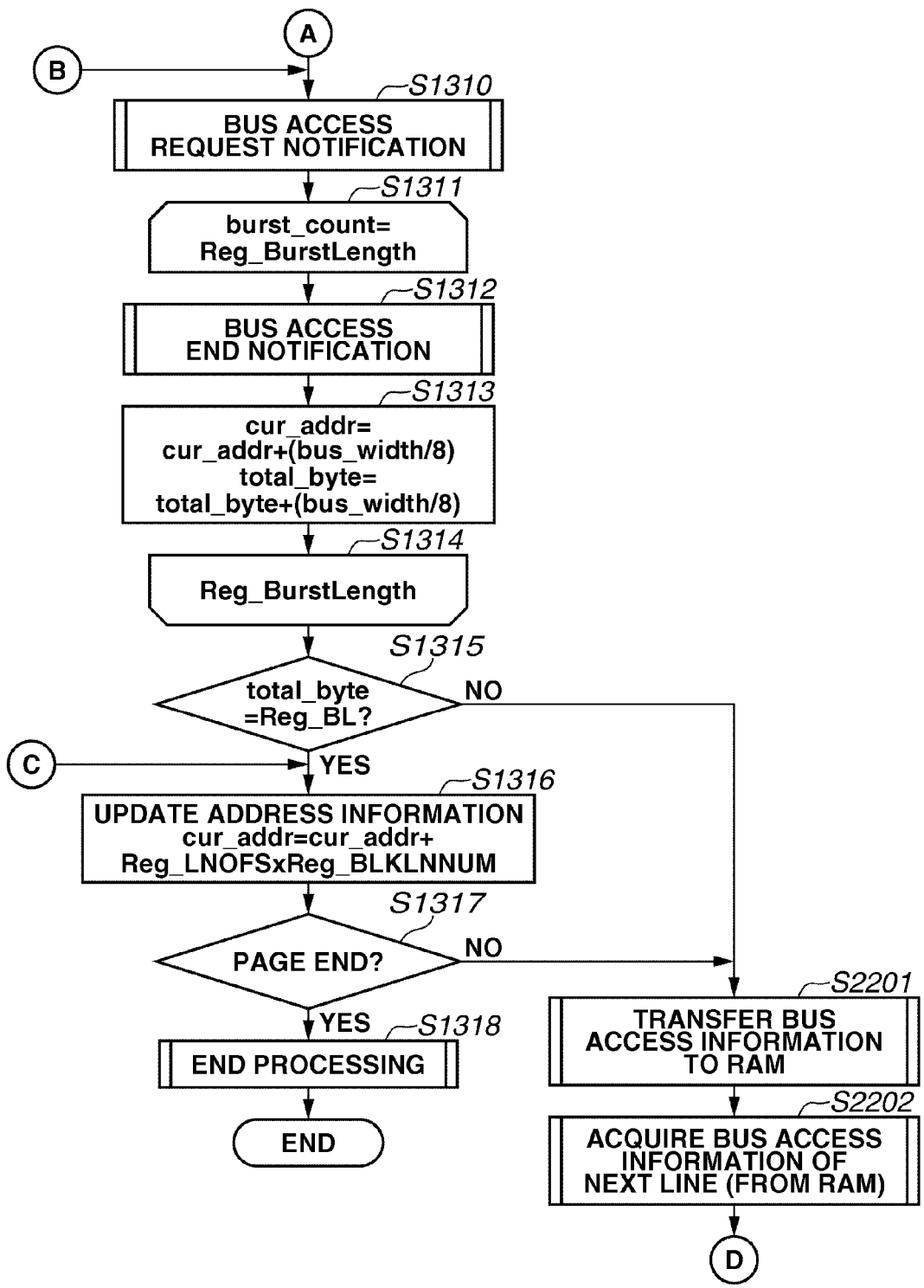
FIG. 25 is a flowchart illustrating an operation of a bus access information unit illustrated in FIG. 24.

Next, a fourth exemplary embodiment of the invention is described hereinafter with reference to FIGS. 24 through 26. FIG. 24 is a block diagram illustrating a DMA controller of an image forming apparatus according to the fourth exemplary embodiment of the present invention. FIG. 25 is a flowchart illustrating an operation of a bus access information unit 306 illustrated in FIG. 24. FIG. 26 illustrates a state in which image data is stored in a RAM 2104 illustrated in FIG. 24. In these drawings, blocks which are the same as those of the first exemplary embodiment are designated by identical reference numerals. Thus, duplicate description thereof is omitted.

When the image forming apparatus according to the present invention deals with a scanning line having a more complicated curve in the image printing unit 106 using the configurations of the first through third exemplary embodiment, the capacity of the data buffer unit 307 increases. Particularly, in a case where such complicated curving of the scanning line cannot be supposed when the apparatus is designed, it is necessary to preliminarily incorporate a buffer having maximum capacity into the apparatus. Consequently, the circuit size of the apparatus increases, which increases the cost thereof.

Thus, in order to more flexibly deal with the curve of the scanning line, the fourth exemplary embodiment employs a configuration illustrated in FIG. 24.

More specifically, a DMA controller 301 according to the present embodiment includes a register unit 302, an image data I/F unit 304, a bus access information unit 306 and a bus I/F unit 2101.

The bus I/F unit 2101 includes a programmably operable sequencer 2102, and two slave sequencers 2103 connected to the sequencer 2102 to deal with bus access requests. Thus, the bus I/F unit 2101 monitors a buffer state of the buss access information unit 306.

The DMA controller 301 according to the present embodiment is provided with two sets of the data buffer 307 and an address register 308. The data buffer 307 is similar to that of the first exemplary embodiment and has a configuration including a double buffer having capacity capable of storing pixel data whose amount is twice of a preset burst transfer length.

According to the present embodiment, a RAM 2104 serving as a local memory, such as a static RAM (SRAM), which is lower in memory access latency than the image memory 203, is provided on a system bus 214. The RAM 2104 is provided to store data of a plurality of lines, instead of the buffers in the DMA controller. If necessary, data such as address information is moved from the RAM 2104 to the bus access information unit 306. If the moved data becomes unnecessary, this data is returned to the RAM 2104 again, and stored therein until this data becomes necessary the next time.

As illustrated in FIG. 25, in step S2201, when a memory access is completed and address information is definitely determined, bus access information (to be described below) of the bus access information unit 306 is temporally transferred to the RAM 2104. Then, in step S2202, the bus access information unit 306 acquires bus access information of the next line. The fourth exemplary embodiment differs from the above first exemplary embodiment in this respect.

According to the fourth exemplary embodiment, the image data described in the foregoing description of the first exemplary embodiment with reference to FIG. 7 is stored in the RAM 2104, as illustrated in FIG. 26. However, according to the fourth exemplary embodiment, it is assumed that the value represented by the register information set in the register Reg_SP is 1 at all times, that is, the number of scanning lines, among which scanning-line-change is performed, is 1.

A data configuration 2309 of data stored in the RAM 2104 includes pixel data, information representing an amount of transferred data, and data representing an address arranged from the left side, as viewed in FIG. 26. When the data size of the pixel data is 8 bytes per pixel, a storage area in the RAM 2104 is secured to maximally store data of three pixels.

First, at the creation of virtual pixel data, fractional pixel data, information representing an amount of transferred data, and data representing a current address are stored therein (S2301). According to this example, no remainder pixel data is stored in the buffer corresponding to the line line3. Thus, only the information representing an amount of transferred data and the information representing an address value are stored therein.

When pixel data corresponding to the line line0 (the value of the register Reg_PX0=5) is received, data representing 1 pixel is left in an associated buffer. Then, pixel data representing the one pixel, the information representing an amount of transferred data (whose data size is 32 bytes), and the information representing a current address value are transferred to the RAM 2104 (S2302).

At that time, the data corresponding to the line line0 is saved to the RAM 2104. Thus, data corresponding to the line line2 is transferred to the bus access control unit 306 (S2302). Subsequently, processing of the line line1 is performed (S2302 through S2303).

Data exchange can be achieved with low latency by repeating the above operation (in steps S2304 to S2308). Consequently, performance can be maintained by burst transfer while restraining increase in the circuit size of the bus access control unit 306.

The present invention can also be implemented by performing the following process. That is, this process includes supplying software (or program) that implements the functions of the above embodiments to the system or apparatus via a network or various types of a recording medium, and then causing a computer of the system or apparatus (e.g., devices such as a CPU or a microprocessor unit (MPU) to read and execute the program. In this case, the present invention covers the recording medium storing the program, and the program itself.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-229770 filed Sep. 8, 2008, which is hereby incorporated by reference herein in its entirety.

What is claimed is:

1. An image forming apparatus having an exposure unit configured to scan an image carrier with irradiation light based on image data, comprising:
   a storage unit;
   a plurality of data retention units configured to respectively correspond to different addresses in a subscanning direction of the storage unit;
   an input unit configured to input image data;
   a writing unit configured to write pixel data of the image data input by the input unit to the plurality of data retention units, based on curve information for correcting a curve of a scanning line of the irradiation light;
   a control unit configured to control, when the writing unit writes a predetermined number of pixel data to a specific one of the plurality of data retention units, the specific one of the plurality of data retention units to output the predetermined number of pixel data to an address in the subscanning direction of the storage unit, which corresponds to the specific one of the plurality of data retention units; and
   a transfer unit configured to transfer the pixel data of the image data stored in the storage unit in units of lines to the exposure unit.

2. The image forming apparatus according to claim 1, wherein each of the plurality of data retention units comprises a double buffer capable of storing pixel data whose amount is twice a preset burst transfer amount, and
   wherein the control unit controls, when the writing unit writes the burst transfer amount of pixel data to the specific one of data retention units, the specific one of the plurality of data retention units to output the burst transfer amount of pixel data by burst transfer.

3. An image forming apparatus having an exposure unit configured to scan an image carrier with irradiation light based on image data, comprising:
   a storage unit;
   a plurality of data retention units configured to respectively correspond to different addresses in a subscanning direction of the storage unit;
   an input unit configured to input image data to the storage unit;
   a writing unit configured to write pixel data of the image data stored in the storage unit to the plurality of data retention units, each of which corresponds to an address in the subscanning direction of the storage unit, based on curve information for correcting a curve of a scanning line of the irradiation light;
   a control unit configured to control, when the writing unit writes a predetermined number of pixel data to a specific one of the plurality of data retention units, the specific one of the plurality of data retention units to output the predetermined number of pixel data; and
   a transfer unit configured to transfer the pixel data of the image data output by the specific one of the plurality of data retention units, to the exposure unit.

4. The image forming apparatus according to claim 3, wherein each of the plurality of data retention units comprises a double buffer capable of storing pixel data whose amount is twice a preset burst transfer amount, and
   wherein the control unit controls, when the writing unit writes the burst transfer amount of pixel data to the specific one of the plurality of data retention units, the specific one of the plurality of data retention units to output the burst transfer amount of pixel data by burst transfer.

5. A control method for an image forming apparatus having an exposure unit configured to scan an image carrier with irradiation light based on image data, a storage unit, and a plurality of data retention units configured to respectively correspond to different addresses in a subscanning direction of the storage unit, comprising:

inputting image data;

writing pixel data of the input image data to one of a the plurality of data retention units, based on curve information for correcting a curve of a scanning line of the irradiation light;

controlling, when a predetermined number of pixel data is written to a specific one of the plurality of data retention units, of the specific one of the plurality of data retention units to output the predetermined number of pixel data to an address in the subscanning direction of the storage unit, which corresponds to the specific one of the plurality of data retention units; and transferring the pixel data of the image data stored in the storage unit in units of lines to the exposure unit.

6. The control method for an image forming apparatus according to claim 5, wherein each of the plurality of data retention units comprises a double buffer capable of storing pixel data whose amount is twice a preset burst transfer amount, and wherein controlling, when the burst transfer amount of pixel data is written to the specific one of data retention units, the specific one of the plurality of data retention units to output the burst transfer amount of pixel data by burst transfer.

7. A control method for an image forming apparatus having an exposure unit configured to scan an image carrier with irradiation light based on image data, a storage unit, and a plurality of data retention units configured to respectively correspond to different addresses in a subscanning direction of the storage unit, comprising:

inputting image data to the storage unit;

writing pixel data of the image data stored in the storage unit to the plurality of data retention units, each of which corresponds to an address in the subscanning direction of the storage unit, based on curve information for correcting a curve of a scanning line of the irradiation light;

controlling, when a predetermined number of pixel data is written to a specific one of the plurality of data retention units, the specific one of the plurality of data retention units to output the predetermined number of pixel data; and transferring the pixel data of the image data output by the specific one of the plurality of data retention units to the exposure unit.

8. The control method for an image forming apparatus according to claim 7, wherein each of the plurality of data retention units comprises a double buffer capable of storing pixel data whose amount is twice a preset burst transfer amount, and wherein controlling, when the burst transfer amount of pixel data is written to the specific one of the plurality of data retention units, the specific one of the plurality of data retention units to output the burst transfer amount of pixel data by burst transfer.

* * * * *